(12) United States Patent
Mason

(10) Patent No.: US 12,731,505 B2
(45) Date of Patent: Sep. 8, 2026

(54) POSITIVE TRAIN CONTROL SIMULATION SYSTEM AND METHOD THEREFOR

(71) Applicant: BNSF Railway Company, Fort Worth, TX (US)

(72) Inventor: Nicholas Glen Mason, Garden City, MO (US)

(73) Assignee: BNSF Railway Company

( * ) Notice: Subject to any disclaimer, the term of this patent is extended or adjusted under 35 U.S.C. 154(b) by 38 days.

(21) Appl. No.: 18/365,802

(22) Filed: Aug. 4, 2023

(65) Prior Publication Data

US 2023/0377474 A1 Nov. 23, 2023

Related U.S. Application Data

(62) Division of application No. 17/698,321, filed on Mar. 18, 2022, now Pat. No. 11,756,446.

(51) Int. Cl.
*G09B 9/04* (2006.01)
*B60T 15/02* (2006.01)
(Continued)

(52) U.S. Cl.
CPC .............. *G09B 9/04* (2013.01); *B60T 15/027* (2013.01); *B60T 17/18* (2013.01); *B61L 27/20* (2022.01); *B61L 27/60* (2022.01)

(58) Field of Classification Search
CPC .......... B61L 27/60; B61L 27/20; B61L 23/24; B60T 15/027; B60T 17/18; G09B 9/04
See application file for complete search history.

(56) References Cited

U.S. PATENT DOCUMENTS 4,041,283 A 8/1977 Mosier
5,618,179 A 4/1997 Copperman et al.
(Continued)

FOREIGN PATENT DOCUMENTS

CA 3021280 A1 4/2019
CN 205750519 U 11/2016
(Continued)

OTHER PUBLICATIONS

U.S. Department of Transportation, Ptc Test Bed Siding Signal Upgrade at the Transportation Technology Center, May 31, 2018.
(Continued)

*Primary Examiner* — Pamela Rodriguez
(74) *Attorney, Agent, or Firm* — Enrique Sanchez, Jr.; J. Miguel Hernandez

(57) ABSTRACT

A system and method for simulating positive train control (PTC) systems in a local and controlled environment using software and hardware. The system can simulate various functionalities of the PTC system in the environment using software and hardware components. The system can instruct the software of a train management computer (TMC) to control electromechanical valves to simulate air compression on brake pipes in response to the PTC system executing a penalty on the locomotive. The system can display statuses of various systems on the locomotive to a user using a cab display unit (CDU). The system can control the software and hardware components to simulate warnings and actions from the PTC system allowing locomotive engineers and conductors to experience the PTC system for optimum training.

11 Claims, 9 Drawing Sheets

(51) Int. Cl.

| | |
|---|---|
| ***B60T 17/18*** | (2006.01) |
| ***B61L 27/20*** | (2022.01) |
| ***B61L 27/60*** | (2022.01) |

(56) References Cited

U.S. PATENT DOCUMENTS

| | | | | |
|---|---|---|---|---|
| 5,967,620 | A | 10/1999 | Truglio et al. | |
| 6,325,464 | B2 | 12/2001 | Truglio et al. | |
| 6,457,782 | B1 | 10/2002 | Truglio et al. | |
| 8,398,405 | B2 | 3/2013 | Kumar | |
| 9,283,945 | B1 | 3/2016 | Kernwein et al. | |
| 9,828,013 | B2 | 11/2017 | Shubs, Jr. et al. | |
| 9,873,443 | B2 | 1/2018 | Sleasman et al. | |
| 10,173,703 | B2 | 1/2019 | Wait et al. | |
| 11,472,454 | B1 * | 10/2022 | Mason | B61L 23/34 |
| 11,756,446 | B1 * | 9/2023 | Mason | B60T 17/18 434/29 |
| 11,787,455 | B1 * | 10/2023 | Mason | B61L 15/0081 703/8 |
| 2019/0120724 | A1 | 4/2019 | Ferrell et al. | |
| 2020/0156678 | A1 | 5/2020 | Moss | |
| 2020/0189635 | A1 | 6/2020 | Hurst | |

FOREIGN PATENT DOCUMENTS

| | | | |
|---|---|---|---|
| CN | 208506591 | U | 2/2019 |
| WO | 2017058970 | A1 | 4/2017 |

OTHER PUBLICATIONS

Weinstein, Margery, Bnsf Railway is on Board with Topnotch Training, Feb. 28, 2018.

PST, PTCPrime—Postive Train Control Training and Simulation to Help Meet Fra Railroad Training Requirements, Aug. 3, 2020.

Princeton Consultants, SATS: An advanced signal design system and simulation tool, Dec. 31, 2019.

Wabtec, TMDS, Aug. 3, 2020.

* cited by examiner

POSITIVE TRAIN CONTROL SIMULATION SYSTEM AND METHOD THEREFOR

CROSS-REFERENCE TO RELATED APPLICATIONS

The present application is a Divisional of U.S. patent application Ser. No. 17/698,321, filed Mar. 18, 2022, the entirety of which is hereby incorporated by reference for all purposes.

TECHNICAL FIELD

The present disclosure relates generally to a simulation of locomotive enforcement events including penalty, emergency, and horn, and more specifically to systems and methods for simulating physical and electrical characteristics corresponding to Positive Train Control enforcement events.

BACKGROUND

Positive Train Control (PTC) systems use communication-based and processor-based train control technology to reliably and functionally prevent train-to-train collisions, over-speed derailments, incursions into established work zones, and movements of trains through switches left in the wrong position. PTC systems harmonize interoperability between electrical and mechanical systems to act in moments when a locomotive disregards a safety plan. For example, the PTC system operates in response to identifying speed of the locomotive is greater than the route speed allows enabling a penalty to the locomotive by applying the brakes. The Federal Railroad Administration mandates PTC systems operating on every mile of railroad meaning every locomotive on the railroad includes a PTC system.

Teaching how a PTC system operates on a locomotive currently lacks any ability to simulate the system components. While training on a locomotive with the PTC system is ideal, this is unlikely because of the inability for a trainer to obtain the locomotive for the time to properly train the upcoming engineers and conductors. Training engineers and conductors can take weeks, months, even years, so removing a locomotive from use can create dissatisfactory efficiency. Additionally, because trainees focusing on becoming an engineer or a conductor cannot practice in a practical environment, the trainees receive insufficient training. Engineers and conductors without proper training with the PTC system can frequently trigger the PTC system on the locomotive by traveling with unsafe locomotive handling. While the PTC system ensures for enhanced safety the risk continues for train derailments and train-to-train collisions.

SUMMARY

The present disclosure achieves technical advantages as a system and method for simulating PTC systems in a local environment using software and hardware, removing the training program from using an actual locomotive. The system can simulate various functionalities of the PTC system in a classroom environment using software and hardware components. For example, the system can couple the software of a train management computer (TMC) to electromechanical valves to simulate air compression on brake pipes in response to the PTC system executing a penalty on the locomotive. The system can display statuses of various systems on the locomotive to a user using a cab display unit (CDU). For example, the TMC enables the hardware and software of the system to communicate information relevant to analyzing warnings from the PTC system. The system can control the software and hardware components to simulate warnings and actions from the PTC system allowing trainees to experience the PTC system for optimum training.

The present disclosure solves the technological problems of providing insufficient training for interacting with the PTC system and restricting trainees from experiencing the PTC system in action by simulating warnings and actions from the PTC system using stand-alone system components, which removes the locomotive from at least some of the training program. By removing the locomotive from at least some of the training program yields flexibility to the instructors while optimizing education for the trainees. Additionally, removing the locomotive from some of the training saves time for the training program while enabling immediate feedback to handling the locomotive in response to the PTC system warnings. Separating at least the initial PTC training for the novice engineers and conductors from operating on locomotives also minimizes liability and risk, such as breaking components on the locomotive and potentially causing a hazardous safety environment.

The present disclosure provides a technical solution to the technical problem by providing software and hardware components for instructional purposes. Particularly, the present disclosure focuses on optimizing training conditions for interacting with the PTC system. In a real-world environment, the PTC system can transmit warnings and instructions to the locomotive instructing it how to respond to certain situations. The present disclosure provides control mechanisms interacting between software and hardware components to simulate a locomotive environment. The simulated locomotive environment enables a user to practice interacting with the PTC system without physical repercussions, such as the PTC system applying the brakes to the locomotive. The present disclosure enables users to interact with locomotive components in a system coupling components corresponding to the PTC system in a classroom environment.

It is an object of the invention to provide a system for simulating PTC applications. It is a further object of the invention to provide a system for controlling a plurality of switches to simulate PTC. It is a further object of the invention to provide a system for providing air pneumatic processes to simulate PTC applications including an air pneumatic system. It is a further object of the invention to provide a method of simulating PTC applications. These and other objects are provided by at least the following embodiments.

In an embodiment, a system for simulating positive train control (PTC) applications, comprising: a user interface; a train management computer (TMC) operably coupled to the user interface; and a pneumatic air system operably coupled to the TMC; wherein the system can simulate a positive train control application by varying an air pressure of the pneumatic air system. Wherein the system further comprising: a communication system operably coupled to the display; a control stand system operably coupled to the TMC; a switch box operably coupled to the TMC; at least one terminal board operably coupled to the switch box and the TMC. Wherein the pneumatic air system includes a penalty system, an emergency system, and a horn system. Wherein the at least one antenna assembly includes a radio system, a global positioning system (GPS), and a Wi-Fi system. Wherein the at least one antenna assembly further includes an ancillary cage system including: a locomotive interface gateway (LIG) module; a display module; and at least one cellular system, and wherein the at least one antenna assembly is further coupled to the display. Wherein the at least one antenna assembly includes an engineer side antenna assembly and a conductor side antenna assembly. Wherein the radio system operates at 220 megahertz (MHz). Wherein the control stand system includes a plurality of fault switches. Wherein the plurality of fault switches can be each coupled to a power supply.

In another embodiment, a system for controlling a plurality of switches to simulate positive train control (PTC) applications, comprising: a train management computer (TMC); a switch box coupled to the TMC, wherein the switch box includes a first cutout switch board; a plurality of cutout switches coupled to the first cutout switch board; and a second cutout switch board coupled to the plurality of cutout switches; and at least one terminal board coupled to the TMC and the switch box. Wherein the at least one terminal board includes a PTC terminal board, a horn display circuit, and a power terminal board. Wherein the plurality of cutout switches includes a penalty cutout switch, an emergency cutout switch, and a horn cutout switch. Wherein the plurality of cutout switches can be each coupled to the power supply.

In another embodiment, a system for providing air pneumatic processes to simulate positive train control (PTC) applications including an air pneumatic system, comprising: an internal delay relay operably coupled to a PTC terminal board; a pulse conversion relay operably coupled to the internal delay relay and the PTC terminal board; an air compressor operably coupled to the pulse conversion relay; a penalty magnetic valve operably coupled to the air compressor; at least one brake pipe pressure transducer operably coupled to the penalty magnetic valve; a brake cylinder pressure transducer operably coupled to the penalty magnetic valve; a vent magnetic valve operably coupled to the penalty magnetic valve and the internal delay relay; an emergency magnetic valve operably coupled to the PTC terminal board; and a horn circuit operably coupled to a horn display circuit from a horn display circuit, wherein the system controls compressed air being applied to the at least one brake pipe pressure transducer and the brake cylinder pressure transducer. Wherein the system further comprises: an equalizing reservoir pressure transducer operably coupled to the penalty magnetic valve; and a reservoir operably coupled to the penalty magnetic valve and the emergency magnetic valve. Wherein the vent magnetic valve includes a choke. Wherein the emergency magnetic valve includes an exhaust. Wherein the air compressor provides compressed air to the brake cylinder. Wherein the compressed air can be 72 pounds per square inch (psi). Wherein the penalty magnetic valve provides compressed air to the equalizer reservoir and the at least one brake pipe. Wherein the compressed air can be 90 psi when the penalty magnetic valve is active, and wherein the compressed air is 58 psi when the penalty magnetic valve can be inactive.

In another embodiment, a method of simulating positive train control (PTC) applications, comprising: receiving at least one input; identifying whether the at least one input corresponds with a PTC simulation application; executing a corresponding system in response to identifying whether the at least one input corresponds with the PTC simulation application. Wherein the PTC simulation application includes a penalty warning, an emergency warning, and a horn enabled. Wherein when a first input of the at least one input corresponds to the penalty warning, the method further comprises: controlling at least one relay of an air pneumatic assembly to energize a penalty magnetic valve of the air pneumatic assembly; and supplying compressed air at a first pressure from the penalty magnetic valve to at least one air pneumatic component. Wherein when a first input of the at least one input corresponds to the penalty warning, the method further comprises: reducing the first pressure to a second pressure; energizing a vent magnetic valve of the air pneumatic system in response to reducing the first pressure; reducing the second pressure completely from the at least one air pneumatic component. Wherein when a first input of the at least one input corresponds to the horn enabled, the method further comprises completing a horn circuit of the air pneumatic system to enable a horn based on a horn instruction. Wherein the horn instruction includes a user input to enable the horn. Wherein the horn instruction includes an input from a train management computer. Wherein the at least one air pneumatic component includes brake pipe, a brake cylinder, and an equalizer reservoir. Wherein the corresponding system includes a penalty system, an emergency system, and a horn system.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1:
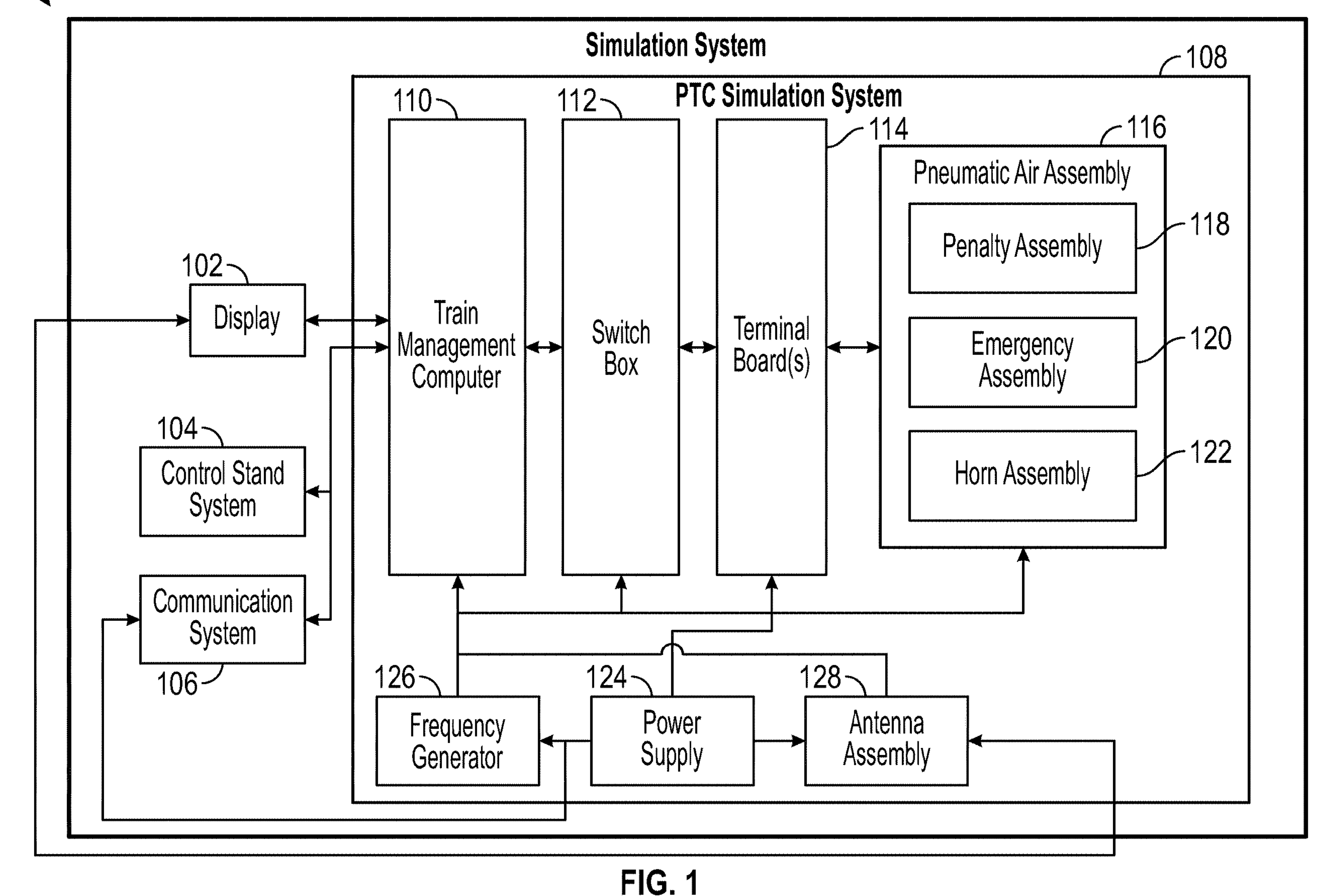
FIG. 1 illustrates a block diagram of a simulation system, in accordance with one or more embodiments of the present disclosure.

FIG. 1 illustrates a schematic view of a simulation system 100, in accordance with one or more embodiments of the present disclosure. The system 100 can include a display 102, a control stand 104, a communication system 106, and a PTC simulation system 108, a power supply 124, a frequency generator 126, and an antenna assembly. The PTC simulation system 108 can include a train management computer (TMC) 110, a switch box 112, one or more terminal boards 114, a pneumatic air assembly 116. The pneumatic air assembly 116 can further include a penalty assembly 118, an emergency assembly 120, and a horn assembly 122. The aforementioned system components (e.g., server(s) 102 and client(s) 150, 152, 154, 156, etc.) can be communicably coupled to each other via physical connections, such that data can be transmitted. For example, the aforementioned system components can be coupled via copper cable, electrical interconnects, interface hardware such as peripheral component interface (PCI), serial advanced technology attachment (SATA), non-volatile memory express (NVMe), among other hardware interconnects.

The display 102 can provide a user an interface to receive and transmit instructions and relevant information. For example, the display 102 can provide the primary visual interface between the trainee and the cab signal system. In another example, the use of the display 102 for the present disclosure will be to simulate an environment of a locomotive using cab signaling. For example, the trainee will interface with simulations of real-world signals received while conducting a locomotive. In an example, the cab signaling can enforce a safe separation between trains and to stop or slow trains in advance of a restrictive situation. For example, the cab signaling in the simulation system 100 can simulate cab signaling continuous in-cab indication to inform the trainee of a simulated track condition ahead. In another example, the display 102 can simulate the cab signaling such as informing the trainee which, if any, mode the simulation system 100 might be in or if it is active at all. In another embodiment, the display 102 can communicate with the PTC simulation system 108 system, providing real-time input, a count-down to a penalty or a means by which to cancel an alarm.

The control stand 104 can integrate locomotive engine functional controls including brake functional controls, whereby the functional controls are within reach of the driver from his/her customary seating position, facing forward at all times. In an example, the control stand 104 can perform functionalities controlling the locomotive such as running the engine of the locomotive, controlling the direction the locomotive travels (e.g., forward or backward), enabling a dynamic braking system, controlling the throttle of the locomotive, and enabling a sand drop function, among other modules not included in this disclosure. For example, the dynamic braking system can include the use of an electric traction motor as a generator when slowing a vehicle such as an electric or diesel-electric locomotive. In another example, the control stand 104 can control the electric traction motor as part of the dynamic braking system. In an example, the sand drop function can include a component to carry sand to assist adhesion in poor rail conditions.

The communication assembly 106 can transmit and receive messages related to status monitoring or other suitable activity, to and from the client or server. In another embodiment, the communication assembly 106 can generate one or more elements for display on the client. The elements can provide additional information related to network connection quality. For example, a notification can be generated by communication assembly 106 and displayed on the client to indicate a status update, network connection status, user access login information, or other suitable information. Additionally, system symbols can be displayed on the client to indicate management status. In another example, the communication assembly 106 can include software and hardware to facilitate network connection. For example, the communication assembly 106 can include a router, switching fabric, a digital signal processor, network interface card (NIC), among other networking components.

The PTC simulation system 108 can provide a user a simulation of a PTC system using various components spanning hardware and software. For example, the PTC simulation system can transmit and receive information from the display 102 and the control stand 104 corresponding to an instance of simulated PTC system activity. For example, the PTC simulation system 108 can simulate the likes of a real-world PTC system when the real-world PTC system would alert the locomotive of a penalty event, an emergency event, or a horn event. For example, in a penalty event, the PTC simulation system 108 can alert the trainee when the locomotive performs maneuvers counter to a safety plan. In another example, the emergency event, the PTC simulation system 108 can alert the trainee when the locomotive performs maneuvers resulting in emergency or critical failure of one or more system components. In another example, in a horn event, the PTC simulation system 108 can alert the trainee when a horn of the locomotive is enabled.

the TMC 110 can be configured to provide data processing capabilities in the PTC simulation system 108. As such, the TMC 110 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The TMC 110 can be a single entity or include a plurality of processing units. These processing units can be physically located within the same device, or the TMC 110 can represent processing functionality of a plurality of devices or software functionality operating alone, or in concert.

The TMC 110 can be configured to execute machine-readable instructions or machine learning modules via software, hardware, firmware, some combination of software, hardware, and/or firmware, and/or other mechanisms for configuring processing capabilities on the TMC 110. As used herein, the term "machine-readable instructions" can refer to any component or set of components that perform the functionality attributed to machine-readable instructions. This can include one or more TMC 110 during execution of processor-readable instructions, the processor-readable instructions, circuitry, hardware, storage media, or any other components.

The TMC 110 can be configured with machine-readable instructions having one or more functional modules. The machine-readable instructions can include control logic for implementing various functionality, as described in more detail below. The machine-readable instructions can include certain functionality associated with the simulation system 100. Additionally, the machine-readable instructions can include instructions that can process, read, and write data to the display 102, the control stand 104, the power supply 124, or any other component of the simulation system 100.

The TMC 110 can include electronic storage including non-transitory storage media that electronically stores information. The electronic storage media can include one or both systems storage that can be provided integrally (e.g., substantially non-removable) with the TMC 110 and/or removable storage that can be removably connectable to the TMC 110 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions, software algorithms, control logic, data generated by processor(s), data received from server(s), data received from computing platform(s), and/or other data that can enable server(s) to function as described herein. The electronic storage can also include third-party databases accessible via a network.

The switch box 112 can include a collection of one or more switches. For example, the switches can include electrical switches, electromechanical switches, relays among other types of switches. In an example, electrical switches can include an electrical component that can disconnect or connect the conducting path in an electrical circuit, interrupting the electric current or diverting it from one conductor to another. In another example, the switches can operate by process variables such as pressure, temperature, flow, current, voltage, and force, acting as sensors in a process and used to automatically control a system. In another example, the switches can include a relay which can include a switch that is operated by another electrical circuit.

The terminal board(s) 114 can include an insulating slab on which electronic terminals are mounted. For example, the terminal board(s) 114 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation system 100. In an example, the inputs and outputs can include copper terminals from switches, relays, or some other electronic component. In another example, the terminal board(s) 114 can provide an interface between the TMC 110 and the pneumatic air assembly 116. For example, the terminal board(s) 114 are physically coupled to each of the switch box 112 and the air pneumatic assembly 116 using a conductive material. In another example, the terminal board(s) can route a plurality of inputs from the switch box 112 as outputs to the pneumatic air assembly 116 based on a circuit schematic of the simulation system 100. For example, the switch box 112 can transmit the output from a penalty cutout switch of the switch box 112 to the terminal board(s) 114, and in turn, the terminal board(s) 114 can transmit the output from the penalty cutout switch to the corresponding component in the air pneumatic assembly 116.

The pneumatic air assembly 116 can receive an electrical input and convert the electrical input to mechanical energy to control air pressure. In an example, the pneumatic air assembly 116 can include at least three systems. For example, the at least three systems can include a penalty assembly 118, an emergency assembly 120, and a horn assembly 122. In an example, the pneumatic air assembly 116 can interconnect the components of the at least three systems using a combination of electrical and electromechanical components. For example, the inputs to the pneumatic air assembly 116 can include conductive wire or cable to transmit various electrical signals representing information from the terminal board(s) 114. Alternatively, in another example, the pneumatic air assembly 116 can include electromechanical magnetic valves to transduce electrical energy to mechanical energy for building and releasing air pressure. For example, a magnetic valve can use magnetic actuation to enhance response time and improve stability positioning.

The penalty assembly 118 can receive an electrical input and convert the electrical input to mechanical energy to control air pressure based on a penalty instruction from the TMC 110. For example, the penalty instruction from the TMC 110 can correspond to a trainee mishandling the simulation system 100. In an example, the trainee can mishandle components of the control stand 104 resulting in the TMC 110 to execute the penalty instruction, which in turn, results in the penalty assembly 118 receiving the penalty instruction. Alternatively, in another example, the penalty assembly 118 can include components energized at all times. For example, the penalty assembly 118 can include at least one magnetic valve in a state of being energized at all times, and when a voltage from the at least one magnetic valve decreases to a threshold, the penalty assembly 118 will be engaged.

The emergency assembly 120 can receive an electrical input and convert the electrical input to mechanical energy to control air pressure based on an emergency instruction from the TMC 110. For example, the emergency instruction from the TMC 110 can correspond to a trainee mishandling the simulation system 100. In an example, when the voltage of the magnetic valve in the penalty assembly 118 lowers, the drop in voltage instructs the emergency instruction to execute, which in turn, results in the emergency assembly 120 to be enabled. Alternatively, in another example, the emergency assembly 120 can include components in a low energy state at times other than when the magnetic valve of the penalty assembly 118 is in a low voltage state.

The horn assembly 122 can receive an electrical input and convert the electrical input to mechanical energy to control air pressure based on a horn instruction from the TMC 110. For example, the horn instruction from the TMC 110 can correspond to a trainee instructing the simulation system 100 to activate the horn of the locomotive. In an example, when the trainee executes the horn, the action by the trainee instructs the horn instruction to execute, which in turn, results in the horn assembly 122 to be enabled. Alternatively, in another example, the horn assembly 122 can include components in a low energy state at times other than when the trainee activates the horn.

The power supply 124 can include an electrical device that supplies electric power to an electrical load. For example, the power supply can convert electric current from a source to the correct voltage, current, and frequency to power a load. In an example, the load can include the various components of the simulation system 100. For example, the power supply 124 can distribute the proper voltages from an external bench power supply to generate the excitation for the functionality of the electrical aspect corresponding to the pneumatic air assembly 116, along with the components of the control stand 104. In another example, the bench power supply can include a 65 volt and 1.65 amp power supply. In an example, the proper voltages can include positive and negative voltages which are then transmitted to the various locations discussed above.

The frequency generator 126 can include an electronic device to generate electronic signals with set properties of amplitude, frequency, and wave shape. For example, the frequencies generate signals used as a stimulus for electronic measurements. In an example, the frequency generator 126 can generate various frequencies for wheel speed indications. For example, the frequencies can correspond to the wheel speed indications based on a relation between a wheel speed and rotational frequency.

The antenna assembly 128 can include at least one antenna for communicating wirelessly using particular frequencies. For example, the antenna assembly 128 can include at least one antenna system for transmitting and receiving wireless communications. In an example, the antenna assembly 128 can transmit and receive wireless communications at a frequency of 220 megahertz (MHz). In another example, the antenna assembly 128 can include at least one cellular antenna assembly corresponding to at least one wireless communication carrier for transmitting and receiving information using wireless communication channels corresponding to radio frequencies of at least one wireless communication carrier. In another example, the antenna assembly 128 can include global position system (GPS) capability to identify and verify geo-locations based on satellite positioning relative to the GPS system.

Figure 2:
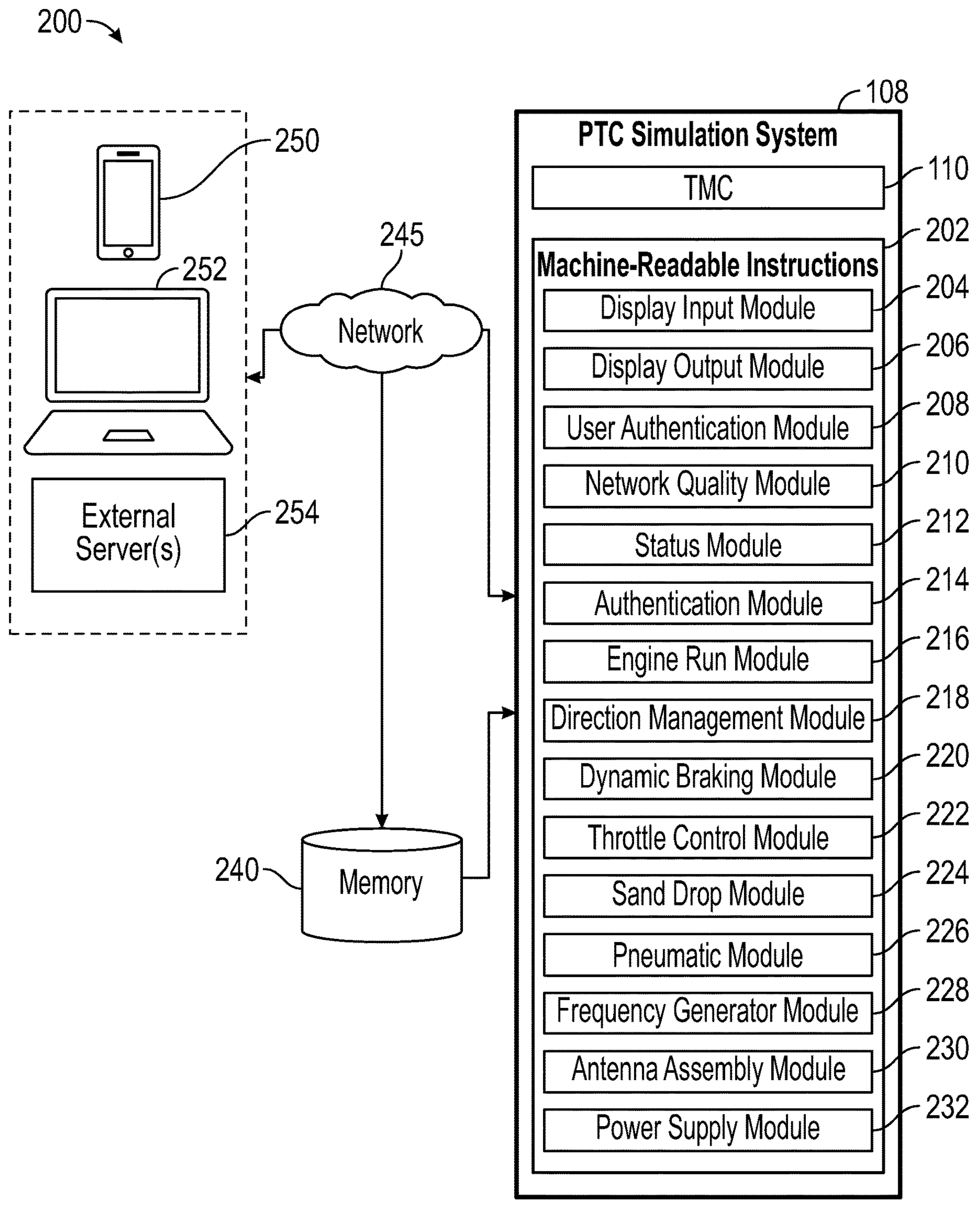
FIG. 2 illustrates a simulation system, in accordance with one or more embodiments of the present disclosure.

FIG. 2 illustrates a schematic view of a simulation system 200, in accordance with one or more embodiments of the present disclosure. The simulation system 200 can include the PTC simulation system 108, the TMC 110, machine-readable instructions 202, including a display module 204, display output module 206, user authentication module, 208, network quality module 210, status module 212, authentication module 214, engine run module 216, direction management module 218, dynamic braking module 220, throttle control module 222, sand drop module 224, pneumatic module 226, frequency generator module 228, antenna assembly module 230, and power supply module 232, among other relevant modules. The PTC simulation system 108 can be operably coupled to one or more clients via a network 245. The clients can be a physical device (e.g., mobile phone 250, laptop 252, external server(s) 254, desktop computer, wearable device, or other suitable device), program, or application. In another embodiment, a client can include an external server 254 having an application configured to communicate with the PTC simulation system 108 over the network 245.

The aforementioned system components (e.g., PTC simulation system 108 and client(s) 250, 252, 254, etc.) can be communicably coupled to each other via the network 245, such that data can be transmitted. The network 245 can be the Internet, intranet, or other suitable network. The data transmission can be encrypted, unencrypted, over a virtual private network (VPN) tunnel, or other suitable communication means. The network 245 can be a wide area network (WAN), local area network (LAN), personal area network (PAN), or other suitable network type. The network communication between the clients, the PTC simulation system 108, or any other system component can be encrypted using pretty good privacy (PGP), Blowfish, Twofish, triple data encryption standard (3DES), hypertext transfer protocol secure (HTTPS), or other suitable encryption. The simulation system 200 can be configured to provide communication via the various systems, components, and modules disclosed herein via an application programming interface (API), peripheral component interface (PCI), PCI-Express, American National Standards Institute (ANSI)-X12, Ethernet, Wi-Fi, Bluetooth, or other suitable communication protocol or medium. Additionally, third party systems and databases can be operably coupled to the system components via the network 245.

The data transmitted to and from the components of simulation system 200 (e.g., the PTC simulation system 108 and clients), can include any format, including JavaScript Object Notation (JSON), transfer control protocol (TCP)/internet protocol (IP), extensible markup language (XML), hypertext markup language (HTML), American Standard Code for Information Interchange (ASCII), short message service (SMS), comma-separated value (CSV), representational state transfer (REST), or other suitable format. The data transmission can include a message, flag, header, header properties, metadata, and/or a body, or be encapsulated and packetized by any suitable format having same.

The PTC simulation system 108 can be implemented in hardware, software, or a suitable combination of hardware and software therefor, and may comprise one or more software systems operating on one or more servers, having the TMC 110, with access to memory 240. The PTC simulation system 108 can include electronic storage, one or more processors, and/or other components. The PTC simulation system 108 can include communication lines, connections, and/or ports to enable the exchange of information via a network 245 and/or other computing platforms. The PTC simulation system 108 can also include a plurality of hardware, software, and/or firmware components operating together to provide the functionality attributed herein to the PTC simulation system 108. For example, the PTC simulation system 108 can be implemented by a cloud of computing platforms operating together as the PTC simulation system 108, including Software-as-a-Service (SaaS) and Platform-as-a-Service (PaaS) functionality. Additionally, the PTC simulation system 108 can include memory 240.

The memory 240 can comprise electronic storage that can include non-transitory storage media that electronically stores information. The electronic storage media of electronic storage can include one or both of system storage that can be provided integrally (e.g., substantially non-removable) with the PTC simulation system 108 and/or removable storage that can be removably connectable to the PTC simulation system 108 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 245.

The TMC 110 can be configured to provide data processing capabilities in the PTC simulation system 108. As such, the TMC 110 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The TMC 110 can be a single entity or include a plurality of processing units. These processing units can be physically located within the same device, or the TMC 110 can represent processing functionality of a plurality of devices or software functionality operating alone, or in concert.

The TMC 110 can be configured to execute machine-readable instructions 202 or machine learning modules via software, hardware, firmware, some combination of software, hardware, and/or firmware, and/or other mechanisms for configuring processing capabilities on the TMC 110. As used herein, the term "machine-readable instructions" can refer to any component or set of components that perform the functionality attributed to the machine-readable instructions 106. This can include one or more physical processors during execution of processor-readable instructions, the processor-readable instructions, circuitry, hardware, storage media, or any other components.

The PTC simulation system 108 can be configured with machine-readable instructions having one or more functional modules. The machine-readable instructions 202 can be implemented on one or more PTC simulation system 108, having the TMCs 110, with access to memory 240. The machine-readable instructions 202 can include control logic for implementing various functionality, as described in more detail below. The machine-readable instructions 202 can include certain functionality associated with the simulation system 200. Additionally, the machine-readable instructions 106 can include a smart contract or multi-signature contract that can process, read, and write data to the database, distributed ledger, or blockchain.

Figure 3:
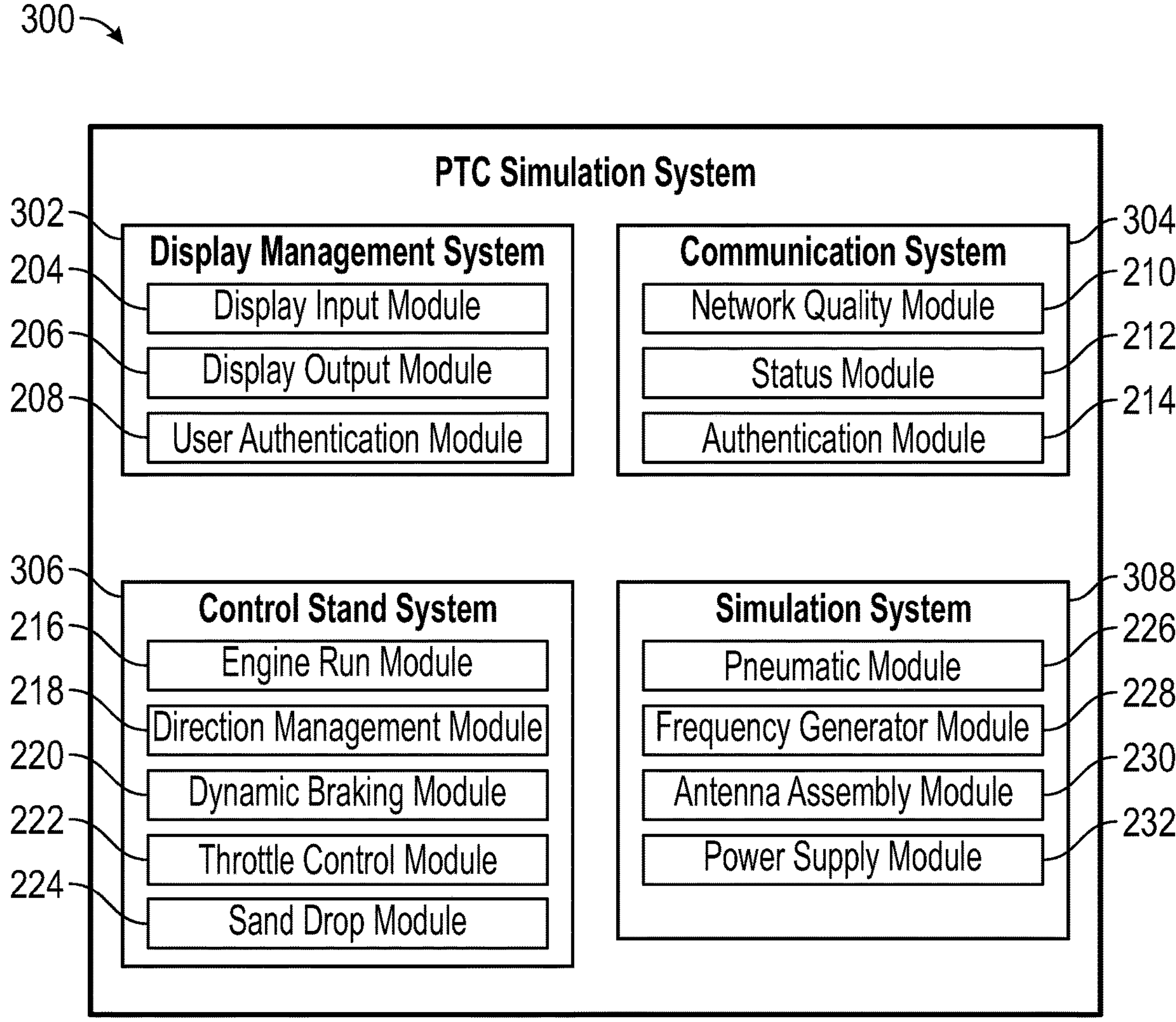
FIG. 3 illustrates a block diagram of a PTC simulation system, in accordance with one or more embodiments of the present disclosure.

FIG. 3 illustrates a schematic view of a PTC simulation system 300, in accordance with one or more embodiments of the present disclosure. The PTC simulation system 300 can include a display management system 302, a communication system 304, a locomotive control stand system 306, and a simulation system 308. Although certain embodiments may be directed towards simulating a penalty system, an emergency system, and a horn system of a PTC system, the PTC simulation system 300 can be used to simulate various other railroad system components for optimum training.

In one embodiment, the display management system 302 can include the display input module 204, the display output module 206, and the user authentication module 208. The display input module 204, the display output module 206, and the user authentication module 208 can implement one or more algorithms to facilitate retrieval and delivery of instructions, including status, selection, and authentication algorithms. The algorithms and their associated thresholds and/or signatures can be programmable to suit a particular event, application, function, facility, or other requirement. The display management system 302 can be configured to retrieve and modify instructions related to one or more simulation events or other suitable activity, to and from a user, a client, or a server. In another embodiment, the display management system 302 can generate one or more elements for display on the user device. The elements can provide additional information related to the status of PTC simulation management. For example, notifications can be generated by the display management system 302 and displayed on the display or the client to indicate simulated locomotive parameters including engine running, direction of travel, dynamic braking enabled, throttle level, antenna assembly enabled, wheel speed and stability, or other suitable information. Additionally, system symbols can be displayed on the client to indicate task, inspection, or analysis status.

The display input module 204 can receive inputs from a trainee, the TMC 110, and the antenna assembly 128. For example, the inputs can include the display input module 204 receiving instructions from the trainee indicating a query for more information. In an example, the actions the trainee will take can include pressing a button on the display 102 corresponding to a select function by the display input module 204. For example, the trainee can select a sensor output on the display 102 by pressing a button corresponding to the sensor output, which executes the select function command by the display input module 204. In another example, the display 102 can display various simulated and/or real sensor readings, which the trainee can select. In an example, the instructions from the trainee can include at least one button pressed, a touchscreen maneuver, a scroll and click method, or some other common display methods. In another example, the display input module 204 can receive incoming messages regarding railroad event notifications. For example, the railroad event notification can include PTC enforcement events, such as a penalty, an emergency, or a horn event. In another example, the display input module 204 can receive wireless communication signal strength notifications from the antenna assembly 128. For example, the antenna assembly 128 can transmit a notification of the signal strength of at least one wireless communication method to the display 102, and in turn, the display input module 204 can receive the notification and display corresponding symbols and values according to the notification.

The display output module 206 can transmit outputs to a trainee, the TMC 110, and the antenna assembly 128. For example, the outputs can include the display output module 206 transmitting instructions from the trainee indicating a query for more information. In an example, the actions the trainee will take can include pressing a button on the display 102 corresponding to a select function, which is transmitted to the TMC 110 for execution. For example, the trainee can select a sensor output on the display 102 by pressing a button corresponding to the sensor output, which transmits the select function instruction by the display output module 206 to the TMC 110. In another example, the display output module 206 can transmit wireless communication signal connection notifications to the antenna assembly 128. For example, the display output module 206 can transmit the notification for terminating a wireless communication method to the antenna assembly 128.

The user authentication module 208 can generate an authentication token for a particular trainee, instructor, user, session, or request. In another embodiment, the display input module 204 can access the network 245 without user credentials. In another embodiment, the display input module 204 can generate an authentication token using user data stored in the client. For example, a user can access a client and/or the PTC simulation system 300 by providing valid credentials via a login page or screen, including a username and password, biometrics, multi-factor authentication, or other suitable credential, such credentials, along with a user's information such as name, username, employee number, etc., can be stored in the client or server. In another embodiment, the display input module 204 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology.

In another embodiment, the authentication token can allow for single sign-on authentication to the server and/or memory from the client. In another embodiment, the display input module 204 can operate without a user interface. In another example, the display input module 204 can provide a user interface for a user to access the display input module 204. The automated workflow system 200 can utilize the display input module 204 to provide a user interface for receiving relevant data.

In one embodiment, the communication system 304 can include network quality module 210, status module 212, and authentication module 214. The include network quality module 210, status module 212, and authentication module 214 can implement one or more algorithms to facilitate status monitoring of warnings from the PTC system simulation, including a penalty, emergency, and horn enable algorithm. The algorithms and their associated thresholds and/or signatures can be programmable to suit a PTC event simulation system, application, function, facility, or other requirement. The communication system 304 can be configured to transmit and receive messages related to status monitoring or other suitable activity, to and from the client or server. In another embodiment, the communication system 304 can generate one or more elements for display on the client. The elements can provide additional information related to network connection quality. For example, a notification can be generated by the communication system 304 and displayed on the client to indicate a status update, network connection status, user access login information, or other suitable information. Additionally, system symbols can be displayed on the client to indicate management status.

In one embodiment, the network quality module 210 can query a client coupled to the PTC simulation system 300 regarding a network quality. For example, the network quality module 210 can detect a strength of a wireless or wired communication signal between the PTC simulation system 300 and a corresponding network, such as the network 245. In another example, the network quality module 210 can detect available networks for the PTC simulation system 300 to connect. For example, the network quality module 210 can identify network characteristics and whether the network characteristics are suitable for the PTC simulation system 300. In an example, the network quality module 210 can compare a preferred network by the PTC simulation system 300 to the network 245 and determine whether the network 245 is suitable as the preferred network. For example, the PTC simulation system 300 can transmit and receive information in an internet protocol (IP) version 6 (IPv6) communication method, while the network 245 can enable an IP version 4 (IPv4), which includes aspects incompatible with IPv6 (e.g., header format differences).

In one embodiment, the status module 212 can list data stored on the client or server for a particular user. In another exemplary embodiment, the status module 212 can indicate the status of one or entries stored on the client or server for a particular user. For example, an inspection stored on the client or server can be displayed on the client and labeled with its status (e.g., "in progress," "completed," or "to be completed") on a dashboard page of the client. In another exemplary embodiment, the status module 212 can display a notification on the client of a status change or a new requirement (e.g., new or re-inspection, capital plan generation, approval request, change request, etc.).

The authentication module 214 can authenticate the network 245. In one exemplary embodiment, the authentication module 214 can authenticate the network 245 or session using a username, password, authentication token, biometric, or other suitable attribute received from the client. In another exemplary embodiment, the authentication module 214 can generate an authentication token for a particular network, session, or request. In one exemplary embodiment, the authentication module 214 can generate an authentication token using network data from in the client. In another exemplary embodiment, the authentication module 214 can process at least a portion of the credentials and/or network information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In another exemplary embodiment, the authentication token can allow for single sign-on authentication to the server and/or memory from the client.

In one embodiment, the locomotive control stand system 306 can include the engine run module 216, direction management module 218, dynamic braking module 220, throttle control module 222, and the sand drop module 224. The engine run module 216, direction management module 218, dynamic braking module 220, throttle control module 222, and the sand drop module 224 can implement one or more algorithms to facilitate simulation of a locomotive components traveling on a railroad, including an engine startup, travel direction, and throttle algorithm. The algorithms and their associated thresholds and/or signatures can be programmable to suit a particular PTC simulation event, such as a penalty, emergency, or horn event, or another requirement. The locomotive control stand system 306 can be configured to transmit and receive messages related to locomotive simulations or other suitable activity, to and from the client or server. In another embodiment, the locomotive control stand system 306 can generate one or more elements for display on the display 102. The elements can provide additional information related to locomotive maneuvering. For example, a notification can be generated by the locomotive control stand system 306 and displayed on the display 102 to indicate a sensor output, a switch status, event monitoring, or other suitable information. Additionally, system symbols can be displayed on the client to indicate a current sensor output reading, an event status, an error event, or other relevant PTC system information.

In one embodiment, the engine run module 216 can generate a start instruction for an engine. For example, the engine run module 216 can generate the start instruction for a physical engine or a simulated engine. In an example, the start instruction corresponds to the simulated engine. In another example, the start instruction can include physical or virtual components. For example, the start instruction can include a physical switch on a dashboard, and when the physical switch is in an "on" state, the start instruction can enable the engine. In an example, the physical switch can include electrical and mechanical components allowing a trainee to enable the engine of the locomotive using an electrical to mechanical transducer to convert the electrical signal from the state of the physical switch to mechanical energy to enable the engine. In another example, the start instruction can include a virtual switch on a display, and when the virtual switch is in an "on" state, the start instruction can enable the engine. In an example, the virtual switch can include an icon on the display 102 allowing the trainee to enable the engine.

In an embodiment, one or more engine run thresholds can determine whether the control stand system 306 engages an engine run system of the locomotive to initialize an engine for the locomotive. The system can correspond an engine run threshold to a signal from the engine run module 216 to determine whether the engine run module 216 is active. For example, when the engine of the locomotive is enabled, a user activates a switch from an off position to an on position, or another means for activating a mechanical or an electromechanical system. In another example, when the system receives an improper engine run instruction outside of the engine run threshold, the system can generate an error. The error notification can correspond to at least one fault switch (e.g., switches 804-826 in FIG. 8).

In one embodiment, the direction management module 218 can direct the locomotive to travel in a particular direction based on a direction instruction. For example, the locomotive can include a physical locomotive or a simulated locomotive. In an example, the direction management module 218 can direct the simulated locomotive in the particular direction based on the direction instruction. For example, the direction management module 218 can indicate either a forward motion or a backward motion. In another example, the direction management module 218 can include physical or virtual components. For example, the direction instruction can include a physical lever on a dashboard, and when the trainee moves the physical lever in a desired direction, the direction instruction can engage wheels of the locomotive to move in the desired direction. In an example, the physical lever can include electrical and mechanical components allowing the trainee to engage the locomotive using an electrical to mechanical transducer to convert the electrical signal from the movement of the physical lever to mechanical energy to rotate the wheels. In another example, the direction instruction can include a virtual sliding scale on a display, and when the trainee moves the virtual sliding scale from one end of the scale to another, the direction instruction can engage the wheels of the locomotive. In an example, the virtual sliding scale can include an icon on the display 102 allowing the trainee to engage the locomotive.

In one embodiment, the dynamic braking module 220 can transmit a dynamic brake instruction. For example, the dynamic brake instruction can include a binary operation to indicate whether dynamic braking is active. In another example, the dynamic braking module 220 can transmit the dynamic brake instruction to the TMC 110 to engage brakes of the locomotive corresponding to a dynamic brake system not shown in the present disclosure.

In an embodiment, one or more dynamic braking thresholds can determine whether the control stand system 306 engages a dynamic braking system of the locomotive to initialize an adaptive braking process for the locomotive. The system can correspond a dynamic braking threshold to a signal from the dynamic braking module 220 to determine whether the dynamic braking module 220 is active. For example, when the dynamic braking system is active, a user activates a switch from an off position to an on position, or another means for activating an electromechanical system. In another example, when the system receives an improper dynamic brake instruction outside of the dynamic braking threshold, the system can generate an error. The error notification can correspond to at least one fault switch (e.g., switches 804-826 in FIG. 8).

In one embodiment, the throttle control module 222 can control a throttle of the locomotive based on a throttle instruction. For example, the throttle control module 222 can control the throttle of a physical locomotive or a simulated locomotive. In an example, the throttle control module 222 can indicate the throttle instruction based on a physical or virtual components. For example, the throttle instruction can include a physical lever on a dashboard, and when the trainee moves the physical lever in a desired direction, the throttle instruction can engage wheels of the locomotive to move at a desired speed. In an example, the physical lever can include electrical and mechanical components allowing the trainee to engage the locomotive using an electrical to mechanical transducer to convert the electrical signal from the movement of the physical lever to mechanical energy to engage the throttle of the locomotive. In another example, the throttle instruction can include a virtual sliding scale on a display, and when the trainee moves the virtual sliding scale from one end of the scale to another, the throttle instruction can engage the wheels of the locomotive. In an example, the virtual sliding scale can include an icon on the display 102 allowing the trainee to engage the locomotive.

In an embodiment, one or more throttle control thresholds can determine whether the control stand system 306 engages a throttle of the locomotive to move the locomotive in a particular direction. For example, when the throttle includes physical components, the throttle can slide forward past a throttle control threshold to indicate a forward direction at a speed proportional to a distance the throttle moved. Alternatively, the throttle can slide backwards past the throttle control threshold to indicate a reverse direction at a speed proportional to a distance the throttle moved. In the foregoing example, the throttle control module 222 can communicate speed and direction values with direction management logic (e.g. the direction management module 218). In another example, when the system receives a throttle instruction outside of an expected input, the system can generate an error. The error notification can correspond to at least one fault switch (e.g., switches 804-826 in FIG. 8).

By way of further example, the locomotive can include throttle control thresholds to impose safety measures to control a speed of the locomotive. For example, when the throttle slides past a high-end throttle control threshold, the system can govern the speed of the locomotive by remaining at a speed as if the throttle was at the high-end throttle control threshold. The high-end throttle control threshold allows for the speed of the train to stay below a predetermined speed to follow safety procedures. In an example, the governing by the system can include a mechanically-controlled manner and an electrically-controlled manner. For example, the mechanically-controlled manner can include physical components to limit the throttle from increasing engine speed. In an example, the physical components can include a hydraulic governor to regulate engine speed. In another example, the electrically-controlled manner can include electromechanical components to limit engine speed. For example, the electromechanical components can include various power servo motors on a hydraulic governor to remotely control fuel intake.

In one embodiment, the sand drop module 224 can control a sandbox on the locomotive based on a sand drop instruction. For example, the sand drop module 224 can control the sandbox of a physical locomotive or a simulated locomotive. In an example, the sand drop module 224 can indicate the sand drop instruction based on a physical or virtual components. For example, the sand drop instruction can include a moveable physical handle on a dashboard, and when the trainee moves the physical handle in a direction, the sand drop instruction can engage the sandbox of the locomotive to disperse sand on the tracks for increased wheel stability. In an example, the physical handle can include electrical and mechanical components allowing the trainee to engage the locomotive using an electrical to mechanical transducer to convert the electrical signal from the movement of the physical handle to mechanical energy to engage the sandbox of the locomotive. In another example, the sand drop instruction can include a virtual sliding scale on a display, and when the trainee moves the virtual sliding scale from one end of the scale to another, the sand drop instruction can engage the sandbox of the locomotive. In an example, the virtual sliding scale can include an icon on the display 102 allowing the trainee to engage the locomotive.

In an embodiment, one or more sand drop thresholds can determine whether the control stand system 306 engages a sand drop system of the locomotive to initialize a process to release sand for the locomotive. For example, the sand can be dropped onto the track to increase traction of the wheels of the locomotive. The system can relate a sand drop threshold to a signal from the sand drop module 224 to determine whether the sand drop module 224 is active. For example, when the sand drop system is enabled, a user activates a switch from an off position to an on position, or another means for activating an electromechanical system. In another example, when the system receives an improper sand drop instruction outside of the sand drop threshold, the system can generate an error. The error notification can correspond to at least one fault switch (e.g., switches 804-826 in FIG. 8).

In one embodiment, the simulation system 308 can include the pneumatic module 226, frequency generator module 228, antenna assembly module 230, and power supply module 232. The pneumatic module 226, frequency generator module 228, antenna assembly module 230, and power supply module 232 can implement one or more algorithms to facilitate automated workflow and simulate a PTC system event, including magnetic valve, interval delay relay, and pulse conversion relay algorithms. The algorithms and their associated thresholds and/or signatures can be programmable to suit a particular pneumatic system, application, function, facility, or other requirement. The simulation system 308 can be configured to transmit and receive messages related to workflow automation or other suitable activity, to and from the TMC 110. In another embodiment, the simulation system 308 can generate one or more elements for display on the user device. The elements can provide additional information related to PTC system simulation. For example, a notification can be generated by the simulation system 308 and displayed on the client to indicate an air pressure, reservoir level, brake pipe status, or other suitable information. Additionally, system symbols can be displayed on the display 102 to indicate an event status, sensor output, or PTC simulation status.

In one embodiment, the pneumatic module 226 can control air pressure based on a state of the PTC simulation. For example, the PTC simulation can include a penalty, emergency, and horn event. In an example, when the PTC simulation indicates the penalty event, the pneumatic module 226 can supply compressed air to electromechanical components of the penalty assembly 118. For example, the pneumatic module 226 can transmit electrical signals to one or more magnetic valves to control compressed air from an air compressor. In an example, the pneumatic module 226 can supply the compressed air to brake pipe pressure transducers, a brake cylinder pressure transducer, and/or an equalizer reservoir pressure transducer. In another example, when the PTC simulation indicates the penalty event, the pneumatic module 226 can supply the compressed air to the electromechanical components to control a motion of the locomotive. For example, the motion of the locomotive can include a physical response or a simulated response. In an example, the physical response can include slowing the locomotive. In another example, the simulated response can include a virtual equivalent of the physical response, such as a digital sensor output on the display 102 indicating a reduction in speed of the locomotive.

In an embodiment, one or more pneumatic thresholds can determine whether the simulation system 308 performs a particular PTC system simulation event. For example, the system can receive an electrical signal instructing the system to execute a penalty event. The system can include pneumatic thresholds to identify a pressure of a pneumatic system to identify whether the penalty event occurred. For example, the penalty system operates at a pressure of 90 psi. So, when the system receives an instruction to execute an emergency event, the system verifies the pressure of the pneumatic system. In an example, the system can execute the emergency event after the penalty event activates. For example, the system can identify the pneumatic system is active based on the pressure, then the system can activate the emergency event. The thresholds can correlate with various pressure values of the pneumatic system. By way of another example, the system can receive an instruction for the emergency event and the pneumatic system has a pressure lower than the threshold. The system then can generate an error notification. In an example, the error notification can include troubleshooting instructions for a user. The error notification can correspond to at least one cutout switch (e.g., switches 406-410 in FIG. 4).

In one embodiment, the frequency generator module 228 can generate electronic signals with set properties of amplitude, frequency, and wave shape. For example, the frequencies generate signals used as a stimulus for electronic measurements. In an example, the frequency generator module 228 can generate various frequencies to represent physical events of the locomotive. For example, the physical events can include wheel speed indications. In an example, the frequency generator module 228 can synthesize the frequencies corresponding to the wheel speed indications based on a relation between a wheel speed and rotational frequency.

In one embodiment, the antenna assembly module 230 can communicate wirelessly using particular radio frequencies. For example, the antenna assembly module 230 can transmit and receive information using wireless communications corresponding to the radio frequencies. In an example, the antenna assembly module 230 can transmit and receive wireless communications at a frequency of 220 megahertz (MHz). In another example, the antenna assembly module 230 can transmit and receive information using wireless communication channels corresponding to radio frequencies of at least one wireless communication carrier. In another example, the antenna assembly module 230 can include global position system (GPS) capability to identify and verify geo-locations based on satellite positioning relative to the GPS system.

In one embodiment, the power supply module 232 can control a distribution of power to the various components of the simulation system 100. For example, the power supply module 232 can receive a voltage from an external power source and determine the various components to distribute the voltage based on a type of the component. In another example, the power supply module 232 can control the voltage from the external power source and transform the voltage to a desired power level, frequency, or current type. For example, the power supply module 232 can determine the desired power level, frequency, or current type based on the component receiving the power. In an example, the power supply module 232 can transform a direct current power supply from the external power source to an alternating current for the various components requiring the alternating current. In another example, the power supply module 232 can distribute power to any, all, or none of the various components requiring power depending on the configuration of the simulation system 100.

Figure 4:
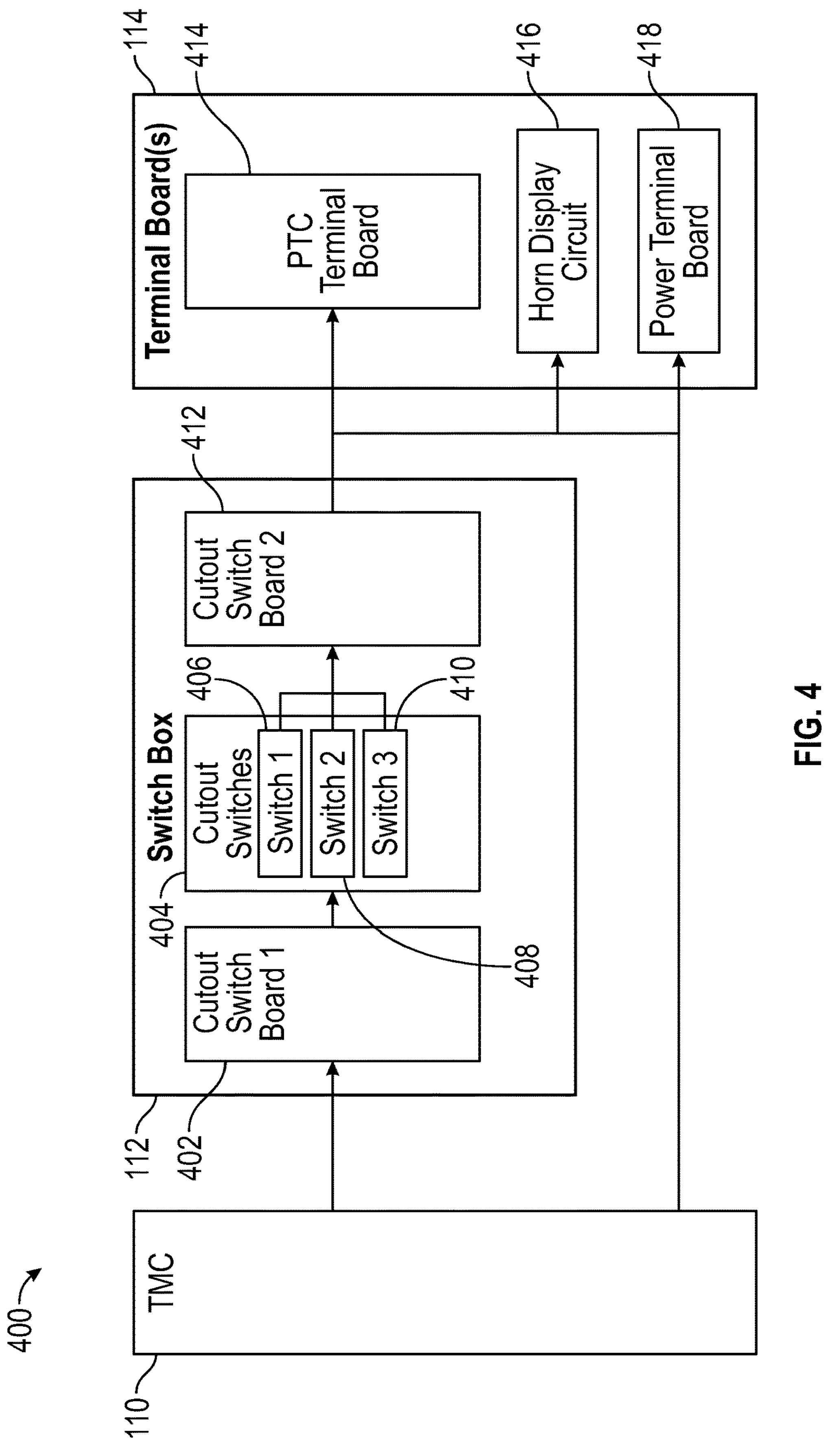
FIG. 4 illustrates a block diagram exemplifying a cutout switch system, in accordance with one or more embodiments of the present disclosure.

FIG. 4 illustrates a block diagram of a cutout switch system 400, in accordance with one or more embodiments of the present disclosure. The cutout switch system 400 can include the TMC 110, the switch box 112, and the terminal board(s) 114, all operably coupled together. The switch box 112 can include a first cutout switch board 402, a plurality of cutout switches 404 including switches 406, 408, and 410, and a second cutout switch board 412. The terminal board(s) 114 can include a PTC terminal board 414, a horn display circuit 416, and a power terminal board 418.

The first cutout switch board 402 can include an insulating slab on which electronic terminals are mounted. For example, the first cutout switch board 402 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation system 100. In an example, the inputs and outputs can include copper terminals from switches, relays, or some other electronic component. In another example, the first cutout switch board 402 can provide an interface between the TMC 110 and the cutout switches 404. For example, the first cutout switch board 402 is physically coupled to each of the cutout switches 404 using a conductive material. In another example, the first cutout switch board 402 can route a plurality of inputs from the TMC 110 as outputs to the cutout switches 404 based on a circuit schematic of the simulation system 100.

The cutout switches 404 can include at least one electric switch that isolates a circuit or piece of equipment after the current has been interrupted. For example, the cutout switches 404 can include the switches 406, 408, and 410.

The switches 406, 408, and 410 can indicate whether the PTC system simulation is applying a penalty, emergency, or horn application based on states of the switches 406, 408, and 410. For example, the switches 406, 408, and 410 can correspond to the application from the PTC simulation system. In an example, the application from the PTC simulation system can correspond to an "on" state when the application is enabled, and an "off" state when the application is disabled. In another example, the switches 406, 408, and 410 can include electrical switches, electromechanical switches, relays among other types of switches. In an example, electrical switches can include an electrical component that can disconnect or connect the conducting path in an electrical circuit, interrupting the electric current or diverting it from one conductor to another. In another example, the switches can operate by process variables such as pressure, temperature, flow, current, voltage, and force, acting as sensors in a process and used to automatically control a system. In another example, the switches can include a relay which can include a switch that is operated by another electrical circuit.

The second cutout switch board 412 can include another insulating slab on which electronic terminals are mounted. For example, the second cutout switch board 412 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation system 100. In an example, the inputs and outputs can include copper terminals from switches, relays, or some other electronic component. In another example, the second cutout switch board 412 can provide an interface between the cutout switches 404 and the terminal board(s) 114. For example, the second cutout switch board 412 is physically coupled to each of the cutout switches 404 using a conductive material. In another example, the second cutout switch board 412 can route a plurality of inputs from the cutout switches 404 as outputs to the terminal board(s) 114 based on a circuit schematic of the simulation system 100.

The PTC terminal board 414 can include another insulating slab on which electronic terminals are mounted. For example, the PTC terminal board 414 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation system 100. In an example, the inputs and outputs can include copper terminals from switches, relays, or some other electronic component. In another example, the PTC terminal board 414 can provide an interface between the second cutout switch board 412 and another component of the simulation system 100. For example, the PTC terminal board 414 is physically coupled to the second cutout switch board 412 using a conductive material. In another example, the PTC terminal board 414 can route a plurality of inputs from the second cutout switch board 412 as outputs to another component of the simulation system 100 based on a circuit schematic of the simulation system 100.

The horn display circuit 416 can receive at least one input to enable a horn system on the locomotive. For example, the horn display circuit 416 can include various electrical components to enable the horn system executed by an electrical signal. In an example, the at least one input can include a horn instruction generated by a trainee pressing a virtual icon on the display 102. Alternatively, the at least one input can include the horn instruction in response to another horn instruction generated by a signal from the TMC 110. In an example, the horn display circuit can control the horn system of a physical locomotive or a simulated locomotive. In an example, the horn display circuit 416 can respond to a horn instruction of the at least one input based on a physical or virtual components. For example, the horn instruction can include a physical button on a dashboard, and when the trainee presses the physical button in a desired manner, the horn instruction can engage the horn system of the locomotive to generate an audible noise. In another example, the horn instruction can include a virtual button on a display interface, and when the trainee presses the virtual button, the horn instruction can engage the horn system. In an example, the virtual button can include an icon on the display 102 allowing the trainee to engage the locomotive.

The power terminal board 418 can include another insulating slab on which electronic terminals are mounted. For example, the power terminal board can interface the power supply 124 with the various components found in the simulation system 100. In another example, the power terminal board 418 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation system 100. In an example, the inputs and outputs can include copper terminals from switches, relays, or some other electronic component. In another example, the power terminal board 418 can provide an interface between the second cutout switch board 412 and another component of the simulation system 100. For example, the power terminal board 418 is physically coupled to the second cutout switch board 412 using a conductive material. In another example, the power terminal board 418 can route a plurality of inputs from the second cutout switch board 412 as outputs to another component of the simulation system 100 based on a circuit schematic of the simulation system 100.

Figure 5:
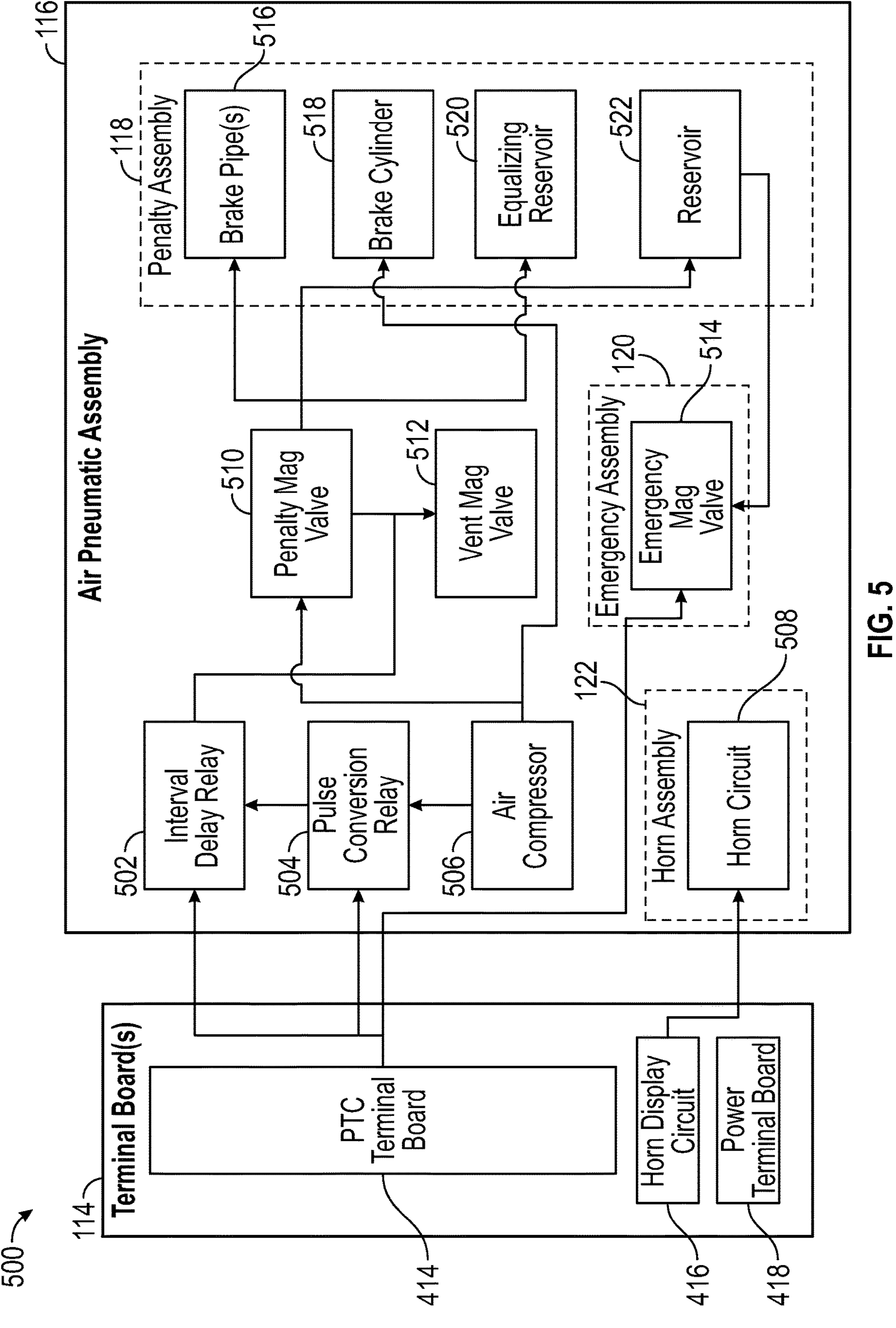
FIG. 5 illustrates a block diagram exemplifying an air pneumatic system, in accordance with one or more embodiments of the present disclosure.

FIG. 5 illustrates a block diagram of an air pneumatic system 500, in accordance with one or more embodiments of the present disclosure. The air pneumatic system 500 can include the termina board(s) 114, the PTC terminal board 414, the horn display circuit 416, the power terminal board 418, the air pneumatic assembly 116. The air pneumatic assembly 116 can include the penalty assembly 118, the emergency assembly 120, and the horn assembly 122. The air pneumatic assembly 116 can include an interval delay relay 502, pulse conversion relay 504, air compressor 506, horn circuit 508, penalty magnetic valve 510, vent magnetic valve 512, emergency magnetic valve 514, brake pipe(s) 516, brake cylinder 518, equalizing reservoir 520, and a reservoir 522. The aforementioned system components can be coupled to each other via physical connections. For example, the aforementioned system components can be coupled via copper cable, electrical interconnects, interface hardware, among other electrical hardware interconnects. In another example, the aforementioned system components can be coupled via mechanical fittings, clamps, mechanical valves, pipes, among other mechanical hardware interconnects.

The interval delay relay 502 can control an output based on a time delay. For example, the interval delay relay 502 can change from an open state to a closed state before or after the time delay. In an example, upon application of an input voltage, an output of the interval delay relay 502 can become energized and a time delay begins. For example, at the end of the time delay, the output is de-energized. In an example, the input voltage must be removed to reset the time delay relay. In an example, the time delay can be seven seconds. In another example, the interval delay relay 502 can control an input of the pulse conversion relay 504.

The pulse conversion relay 504 can provide isolated channels between inputs to convert the inputs into pulse form. For example, the inputs can include inputs from the interval delay relay 502, the PTC terminal board(s) 414, the air compressor 506, among other inputs from the components of the air pneumatic system 500. In another example, the pulse conversion relay 504 can include output pulses having a pulse with a width corresponding to the inputs. For example, the output pulses can include a direct current output based on an alternating current input.

The air compressor 506 can include a pneumatic device that converts power into potential energy stored in pressurized air. For example, the air compressor can force air into a storage tank (not shown in FIG. 5), increasing the pressure, when the storage tank pressure reaches an upper limit, the air compressor 506 can shut off. In an example, the air compressor 506 can provide compressed air to the penalty magnetic valve 510 and the brake cylinder 518. In another example, the compressed air can include pressures of 58 pounds per square inch (psi), 72 psi, and psi. For example, the compressed air can be 58 psi when the PTC simulation enables the penalty application.

The horn circuit 508 can receive at least one input and convert the electrical input to mechanical energy to control air pressure based on a horn instruction. For example, the horn circuit 508 can include at least one resistor modeling the horn system. In an example, when the horn circuit 508 receives the input, the horn circuit 508 can complete the circuit and energize the resistor resulting in an audible sound. In another example, the horn instruction can correspond to a trainee instructing the simulation system 100 to activate the horn system of the locomotive. In an example, when the trainee executes the horn system, the action by the trainee instructs the horn instruction to execute, which in turn, results in the horn circuit 508 to be completed. Alternatively, in another example, the horn circuit 508 can include components in a low energy state at times other than when the horn system is activated.

The penalty magnetic valve 510 can include an electromechanical magnetic valve to transduce electrical energy to mechanical energy for building and releasing air pressure. For example, the penalty magnetic valve 510 can use magnetic actuation to enhance response time and improve stability positioning. In an example, the penalty magnetic valve 510 can receive at least one input. For example, the at least one input can include an input from the PTC terminal board(s) 414. In another example, the penalty magnetic valve 510 can include at least one output. For example, the at least one output can include outputs to the brake pipe(s)

516, the equalizer reservoir 520, and the reservoir 522. In another example, the input can instruct the penalty magnetic valve 510 to de-energize. For example, when the penalty magnetic valve 510 receives the instruction to de-energize, the penalty magnetic valve 510 can transfer the output from a pressure setting of 90 psi to 58 psi. In an example, the output with the 58 psi pressure can provide the compressed air to the equalizing reservoir 520 and brake pipe(s) 516. In another example, the output with the 90 psi can supply the compressed air to be vented.

The vent magnetic valve 512, can include an electromechanical magnetic valve to transduce electrical energy to mechanical energy for building and releasing air pressure. For example, the vent magnetic valve 512 can use magnetic actuation to enhance response time and improve stability positioning. In an example, the vent magnetic valve 512 can receive at least one input. For example, the at least one input can include inputs from the PTC terminal board(s) 414 and the interval delay relay 502. In another example, the vent magnetic valve 512 can include at least one output. For example, the at least one output can include outputs to a choke of the vent magnetic valve 512. In another example, the input can instruct the vent magnetic valve 512 to energize. For example, when the vent magnetic valve 512 receives the instruction to energize, the vent magnetic valve 512 and the reservoir 522 can vent an output from the penalty magnetic valve 510 from a pressure setting of 90 psi to 58 psi.

The emergency magnetic valve 514 can include an electromechanical magnetic valve to transduce electrical energy to mechanical energy for building and releasing air pressure. For example, the emergency magnetic valve 514 can use magnetic actuation to enhance response time and improve stability positioning. In an example, the emergency magnetic valve 514 can receive at least one input. For example, the at least one input can include inputs from the PTC terminal board(s) 414. In another example, the emergency magnetic valve 514 can include at least one output. For example, the at least one output can include outputs to an exhaust of the emergency magnetic valve 514. In another example, the input can instruct the emergency magnetic valve 514 to energize. For example, when the emergency magnetic valve 514 receives the instruction to energize, the emergency magnetic valve 514 and the reservoir 522 can vent compressed air being applied to the brake pipe(s) 516 from to 0 psi.

The brake pipe(s) 516 can include a railway brake power braking system using compressed air as the operating medium. For example, the brake pipe(s) 516 can apply compressed air to push on the brake cylinder 518. In an example, the piston is connected through mechanical linkage to brake shoes that can rub on the train wheels, using the resulting friction to slow the train. In another example, the brake pipe(s) 516 can include pressure sensors showing an increased or decreased pressure in the brake pipe(s) 516. For example, when the PTC simulation applies the emergency application, compressed air is vented from the brake pipe(s) 516 to decrease the pressure. In an example, the decrease in pressure can result in fully applying the brake system of the locomotive. In another example, the decrease in pressure can result in the pressure sensors corresponding to the brake pipe(s) 516 to show no pressure.

The brake cylinder 518 can include a housing, which can include a piston attached to the braking system of the locomotive. For example, a force on the piston can transfer through the brake system to apply a brake shoe force onto the wheel. In an example, the brake cylinder 518 can apply compressed air to the brake system of a physical locomotive or a simulation of the locomotive. For example, the simulation of the locomotive can include at least one pressure sensor to indicate a pressure of the compressed air from the brake cylinder 518 to the brake system. In an example, the brake cylinder 518 can apply the compressed air in response to the PTC simulation enabling the penalty application.

The equalizing reservoir 520 can include a cylinder providing a reference pressure to regulate pressure in the brake pipe(s) 516. For example, when the equalizing reservoir 520 reduces a pressure, the brake pipe(s) 516 reduce pressure. In an example, the equalizing reservoir 520 can reduce the pressure in the brake pipe(s) 516 to slow the locomotive. In another example, the equalizing reservoir 520 can reduce the pressure in the brake pipe(s) 516 resulting in a simulated locomotive to reduce pressure in at least one pressure sensor.

The reservoir 522 can store compressed air to later be used. For example, the reservoir 522 can accumulate and store the compressed air until releasing at a later time. In another example, the reservoir 522 can supplement the compressed air in the air pneumatic system 600 as a compressed air control system. For example, the reservoir 522 can accumulate the compressed air from the penalty magnetic valve 510. In an example, when the penalty magnetic valve 510 vents the compressed air, the reservoir 522 can supply the vent magnetic valve 512 with the compressed air to control the penalty magnetic valve 510 venting process.

Figure 6:
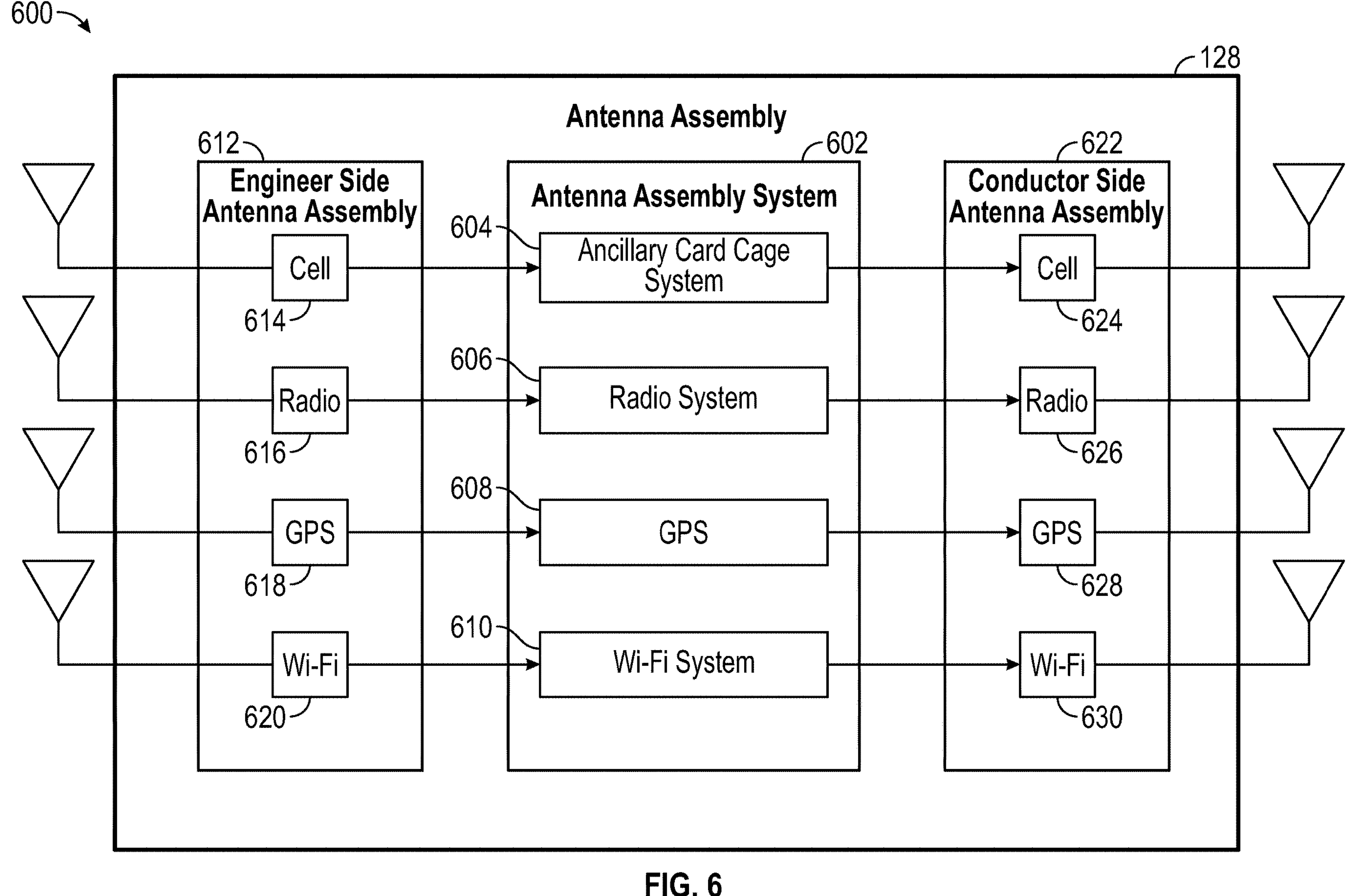
FIG. 6 illustrates a block diagram exemplifying an antenna assembly, in accordance with one or more embodiments of the present disclosure.

FIG. 6 illustrates a block diagram of an antenna assembly 600, in accordance with one or more embodiments of the present disclosure. The antenna assembly 600 can include an antenna assembly system 602, which can include an ancillary card cage system 604, radio system 606, GPS 608, Wi-Fi system 610. The antenna assembly 600 can include an engineer side antenna assembly 612, which includes an engineer cellular system 614, an engineer radio system 616, an engineer GPS 618, and an engineer Wi-Fi system 620. The antenna assembly 600 can include a conductor side antenna assembly 622, which includes a conductor cellular system 624, conductor radio system 626, conductor GPS 628, and conductor Wi-Fi system 630.

The antenna assembly system 602 can include at least one system for communicating wirelessly using particular radio frequencies. For example, the antenna assembly system 602 can include at least one system used for transmitting and receiving digital signals corresponding to electromagnetic wireless communication for various applications. In an example, the antenna assembly system 602 can include hardware and software components to process the digital signals. For example, the antenna assembly system 602 can include a DSP, CPU, GPU, router, among other hardware or software signal processing components. In another example, the antenna assembly system 602 can process the digital signals to determine corresponding information.

The ancillary card cage system 604 can include at least one system for communicating wirelessly using various radio frequency bands. For example, the ancillary card cage system 604 can include at least one system used for transmitting and receiving digital signals corresponding to electromagnetic wireless communication for various applications. In an example, the ancillary card cage system 604 can transmit and receive the digital signals to/from the engineer cellular system 614 and the conductor cellular system 624. In another example, the ancillary card cage system 604 can include hardware and software components to process the digital signals. For example, the ancillary card cage system 604 can include a subscriber identity module (SIM), digital signal processing algorithms for cellular signals, network algorithms for virtually switching the digital signals, among other hardware or software signal processing components. In another example, the ancillary card cage system 604 can process the digital signals to determine corresponding information, such as cellular wireless information. In another example, the ancillary card cage system 604 can include an ability to process the digital signals of at least one wireless communication carrier.

The radio system 606 can include at least one system for communicating wirelessly using particular radio frequencies. For example, the radio system 606 can include at least one system used for transmitting and receiving digital signals corresponding to electromagnetic wireless communication for various applications. In an example, the radio system 606 can transmit and receive the digital signals to/from the engineer radio system 616, the conductor radio system 626, and the TMC 110. In another example, the radio system 606 can include hardware and software components to process the digital signals. For example, the radio system 606 can include a look-up-table for radio frequency access determination, digital signal processing algorithms for cellular signals, network algorithms for virtually switching the digital signal, among other hardware or software signal processing components. In another example, the radio system 606 can process the digital signals to determine corresponding information, such as wireless information regarding railroad safety and emergencies. In another example, the radio system 606 can include an ability to process the digital signals of the 220 MHz radio frequency band.

The GPS 608 can include at least one system for communicating wirelessly using global positioning radio frequencies. For example, the GPS 608 can include at least one system used for transmitting and receiving digital signals corresponding to electromagnetic wireless communication for global positioning applications. In an example, the GPS 608 can transmit and receive the digital signals to/from the engineer GPS 618, the conductor GPS 628, and the TMC 110. In another example, the GPS 608 can include hardware and software components to process the digital signals. For example, the GPS 608 can include a GPS signal authentication algorithm, digital signal processing algorithms for cellular signals, network algorithms for virtually switching the digital signal, among other hardware or software signal processing components. In another example, the GPS 608 can process the digital signals to determine corresponding information, such as wireless information regarding global positioning of a locomotive. In another example, the GPS can include an ability to process the digital signals corresponding to GPS radio frequency bands.

The Wi-Fi system 610 can include at least one system for communicating wirelessly using particular radio frequencies. For example, the Wi-Fi system 610 can include at least one system used for transmitting and receiving digital signals corresponding to electromagnetic wireless communication for various applications. In an example, the Wi-Fi system 610 can transmit and receive the digital signals to/from the engineer Wi-Fi system 620, the conductor Wi-Fi system 630, and the TMC 110. In another example, the Wi-Fi system 610 can include hardware and software components to process the digital signals. For example, the Wi-Fi system 610 can include a look-up-table for radio frequency access determination, digital signal processing algorithms for cellular signals, network algorithms for virtually switching the digital signal, among other hardware or software signal processing components. In another example, the Wi-Fi system 610 can process the digital signals to determine corresponding information, such as wireless information regarding access to the Internet. In another example, the Wi-Fi system 610 can include an ability to process the digital signals of in Wi-Fi radio frequency bands.

The engineer side antenna assembly 612 can include at least one antenna for communicating wirelessly using particular frequencies. For example, the engineer side antenna assembly 612 can include at least one antenna system for transmitting and receiving analog signals in the form of electromagnetic energy. In an example, the engineer side antenna assembly 612 can convert the analog signals to digital signals, and conversely, the digital signals to the analog signals. In another example, the engineer side antenna assembly 612 can encode the digital signals based on the analog signals. In an example, the engineer side antenna assembly system 612 can include hardware and software components to process the digital signals. For example, the engineer side antenna assembly system 612 can include hardware and software components to process the digital signals. For example, the engineer side antenna assembly system 612 can include a digital to analog converter (DAC), analog to digital converter (ADC), among other hardware or software radio frequency components.

The engineer cellular system 614 can include at least one system for transmitting and receiving analog signals corresponding to electromagnetic wireless communication for cellular applications. For example, the engineer cellular system 614 can transmit and receive the analog signals corresponding with various wireless communication carriers. In another example, the engineer cellular system 614 can include hardware and software components to process the analog signals. For example, the engineer cellular system 614 can include a look-up-table for radio frequency access determination, DAC and ADC algorithms for cellular signals, among other software signal processing components. In an example, the engineer cellular system 614 can include an antenna corresponding to the cellular application, a DAC and ADC, an intermediate frequency circuit, a radio frequency encoder, among other hardware signal processing components. In another example, the engineer cellular system 614 can convert the analog signals to digital signals, transmit the digital signals to the ancillary card cage system 604, and receive the digital signals from the ancillary card cage system 604. In another example, the engineer cellular system 614 can include an ability to process signals of at least one wireless communication carrier.

The engineer radio system 616 can include at least one system for transmitting and receiving analog signals corresponding to electromagnetic wireless communication for railroad applications. For example, the engineer radio system 616 can transmit and receive the analog signals corresponding with various railroad communication protocols. In another example, the engineer radio system 616 can include hardware and software components to process the analog signals. For example, the engineer radio system 616 can include a look-up-table for radio frequency access determination, DAC and ADC algorithms for railroad communication signals, among other software signal processing components. In an example, the engineer radio system 616 can include an antenna corresponding to the cellular application, a DAC and ADC, an intermediate frequency circuit, a radio frequency encoder, among other hardware signal processing components. In another example, the engineer radio system 616 can convert the analog signals to digital signals, transmit the digital signals to the radio system 606, and receive the digital signals from the radio system 606. In another example, the engineer radio system 616 can include an ability to process signals at a radio frequency of 220 MHz.

The engineer GPS 618 can include at least one system for transmitting and receiving analog signals corresponding to electromagnetic wireless communication for global positioning applications. For example, the engineer GPS 618 can transmit and receive the analog signals corresponding with various GPS protocols. In another example, the engineer GPS 618 can include hardware and software components to process the analog signals. For example, the engineer GPS 618 can include a look-up-table for radio frequency access determination, DAC and ADC algorithms for GPS signals, among other software signal processing components. In an example, the engineer GPS 618 can include an antenna corresponding to the GPS application, a DAC and ADC, an intermediate frequency circuit, a radio frequency encoder, among other hardware signal processing components. In another example, the engineer GPS 618 can convert the analog signals to digital signals, transmit the digital signals to the GPS 608, and receive the digital signals from the GPS 608. In another example, the engineer GPS 618 can include an ability to process signals at GPS radio frequency bands.

The engineer Wi-Fi system 620 can include at least one system for transmitting and receiving analog signals corresponding to electromagnetic wireless communication for Internet service applications. For example, the engineer Wi-Fi system 620 can transmit and receive the analog signals corresponding with various Wi-Fi protocols. In another example, the engineer Wi-Fi system 620 can include hardware and software components to process the analog signals. For example, the engineer Wi-Fi system 620 can include a look-up-table for radio frequency access determination, DAC and ADC algorithms for Wi-Fi signals, among other software signal processing components. In an example, the engineer Wi-Fi system 620 can include an antenna corresponding to the Wi-Fi application, a DAC and ADC, an intermediate frequency circuit, a radio frequency encoder, among other hardware signal processing components. In another example, the engineer Wi-Fi system 620 can convert the analog signals to digital signals, transmit the digital signals to the Wi-Fi system 610, and receive the digital signals from the Wi-Fi system 610. In another example, the engineer Wi-Fi system 620 can include an ability to process signals at Wi-Fi radio frequency bands.

The conductor side antenna assembly 622 can include at least one antenna for communicating wirelessly using particular frequencies. For example, the conductor side antenna assembly 622 can include at least one antenna system for transmitting and receiving analog signals in the form of electromagnetic energy. In an example, the conductor side antenna assembly 622 can convert the analog signals to digital signals, and conversely, the digital signals to the analog signals. In another example, the conductor side antenna assembly 622 can encode the digital signals based on the analog signals. In an example, the conductor side antenna assembly 622 can include hardware and software components to process the digital signals. For example, the conductor side antenna assembly 622 can include hardware and software components to process the digital signals. For example, the conductor side antenna assembly 622 can include a DAC, ADC, among other hardware or software radio frequency components.

The conductor cellular system 624 can include at least one system for transmitting and receiving analog signals corresponding to electromagnetic wireless communication for cellular applications. For example, the conductor cellular system 624 can transmit and receive the analog signals corresponding with various wireless communication carriers. In another example, the conductor cellular system 624 can include hardware and software components to process the analog signals. For example, the conductor cellular system 624 can include a look-up-table for radio frequency access determination, DAC and ADC algorithms for cellular signals, among other software signal processing components. In an example, the conductor cellular system 624 can include an antenna corresponding to the cellular application, a DAC and ADC, an intermediate frequency circuit, a radio frequency encoder, among other hardware signal processing components. In another example, the conductor cellular system 624 can convert the analog signals to digital signals, transmit the digital signals to the ancillary card cage system 604, and receive the digital signals from the ancillary card cage system 604. In another example, the conductor cellular system 624 can include an ability to process signals of at least one wireless communication carrier.

The conductor radio system 626 can include at least one system for transmitting and receiving analog signals corresponding to electromagnetic wireless communication for railroad applications. For example, the conductor radio system 626 can transmit and receive the analog signals corresponding with various railroad communication protocols. In another example, the conductor radio system 626 can include hardware and software components to process the analog signals. For example, the conductor radio system 626 can include a look-up-table for radio frequency access determination, DAC and ADC algorithms for railroad communication signals, among other software signal processing components. In an example, the conductor radio system 626 can include an antenna corresponding to the cellular application, a DAC and ADC, an intermediate frequency circuit, a radio frequency encoder, among other hardware signal processing components. In another example, the conductor radio system 626 can convert the analog signals to digital signals, transmit the digital signals to the radio system 606, and receive the digital signals from the radio system 606. In another example, the conductor radio system 626 can include an ability to process signals at a radio frequency of 220 MHz.

The conductor GPS 628 can include at least one system for transmitting and receiving analog signals corresponding to electromagnetic wireless communication for global positioning applications. For example, the conductor GPS 628 can transmit and receive the analog signals corresponding with various GPS protocols. In another example, the conductor GPS 628 can include hardware and software components to process the analog signals. For example, the conductor GPS 628 can include a look-up-table for radio frequency access determination, DAC and ADC algorithms for GPS signals, among other software signal processing components. In an example, the conductor GPS 628 can include an antenna corresponding to the GPS application, a DAC and ADC, an intermediate frequency circuit, a radio frequency encoder, among other hardware signal processing components. In another example, the conductor GPS 628 can convert the analog signals to digital signals, transmit the digital signals to the GPS 608, and receive the digital signals from the GPS 608. In another example, the conductor GPS 628 can include an ability to process signals at GPS radio frequency bands.

The conductor Wi-Fi system 630 can include at least one system for transmitting and receiving analog signals corresponding to electromagnetic wireless communication for Internet service applications. For example, the conductor Wi-Fi system 630 can transmit and receive the analog signals corresponding with various Wi-Fi protocols. In another example, the conductor Wi-Fi system 630 can include hardware and software components to process the analog signals. For example, the conductor Wi-Fi system 630 can include a look-up-table for radio frequency access determination, DAC and ADC algorithms for Wi-Fi signals, among other software signal processing components. In an example, the conductor Wi-Fi system 630 can include an antenna corresponding to the Wi-Fi application, a DAC and ADC, an intermediate frequency circuit, a radio frequency encoder, among other hardware signal processing components. In another example, the conductor Wi-Fi system 630 can convert the analog signals to digital signals, transmit the digital signals to the Wi-Fi system 610, and receive the digital signals from the Wi-Fi system 610. In another example, the conductor Wi-Fi system 630 can include an ability to process signals at Wi-Fi radio frequency bands.

Figure 7:
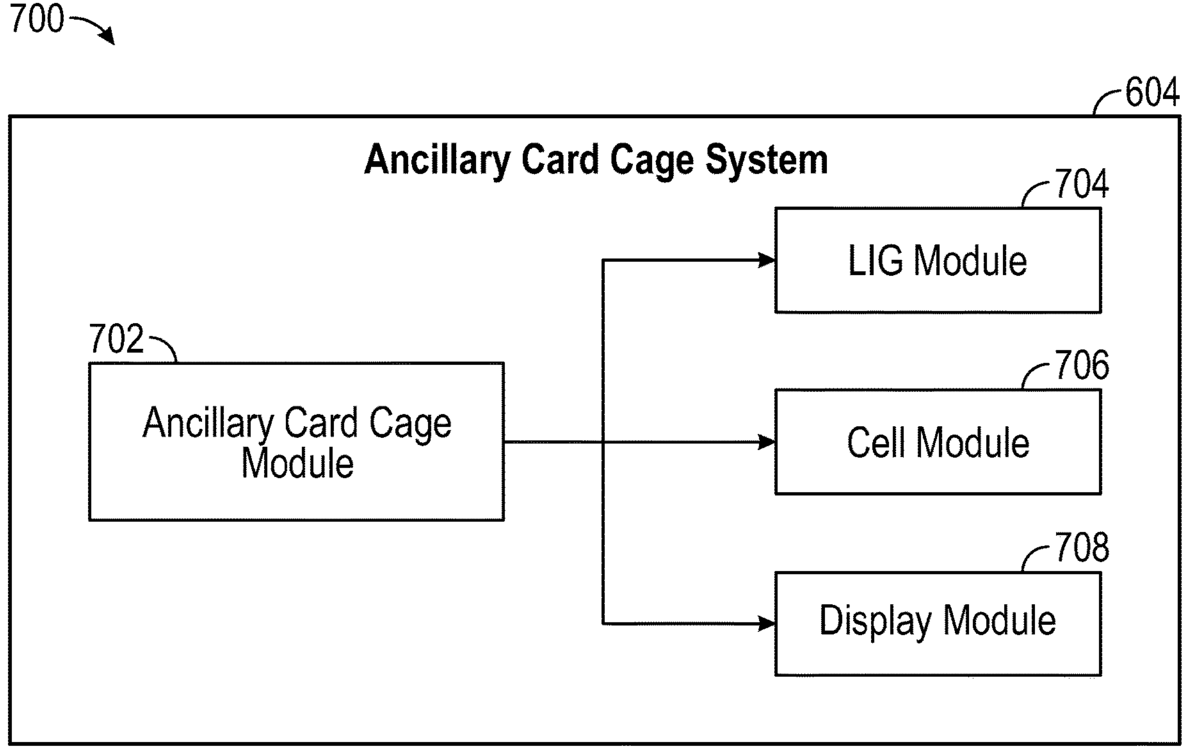
FIG. 7 illustrates a block diagram exemplifying an ancillary card cage, in accordance with one or more embodiments of the present disclosure.

FIG. 7 illustrates a block diagram of an ancillary card cage 700, in accordance with one or more embodiments of the present disclosure. The ancillary card cage 700 can include the ancillary card cage system 604, which includes an ancillary card cage module 702, a locomotive interface gateway (LIG) module 704, a cellular module 706, and a display module 708.

The ancillary card cage module 702 can provide communication capabilities to support a railroad regulation. For example, the ancillary card cage module 702 can include at least one system for processing digital signals corresponding to electromagnetic wireless communication for various applications. In an example, the ancillary card cage module 702 can transmit and receive the digital signals corresponding to a LIG application, cellular communications, and displaying information regarding wireless communication. In another example, the ancillary card cage module 702 can include hardware and software components to process the digital signals. For example, the ancillary card cage module 702 can include a SIM, digital signal processing algorithms for cellular signals, network algorithms for virtually switching the digital signals, among other hardware or software signal processing components. In another example, the ancillary card cage module 702 can process the digital signals to determine corresponding information.

The LIG module 704 can collect, translate, and distribute data from a PTC network. For example, the data can be in accordance with the Association of American Railroads (AAR) standard. In an example, the LIG module 704 can broadcast faults to the PTC network to ensure critical safety management. In an example, the LIG module 704 can transmit and receive the digital signals corresponding to a LIG application. In another example, the LIG module 704 can include hardware and software components to process the digital signals. For example, the LIG module 704 can include a LIG, digital signal processing algorithms for LIG data signals, network algorithms for virtually switching the LIG data signals, among other hardware or software signal processing components.

The cellular module 706 can transmit and receive digital signals corresponding to at least one cellular frequency band. For example, the cellular module 706 can transmit the digital signals to a cellular service provider to wirelessly communicate. In another example, the cellular module 706 can include hardware and software components to process the digital signals. For example, the cellular module 706 can include a SIM, digital signal processing algorithms for cellular signals, network algorithms for virtually switching the digital signals, among other hardware or software signal processing components. In another example, the cellular module 706 can process the digital signals to determine cellular information. For example, the cellular information can include text, audible communication, video communication, among other information types. In another example, the cellular module 706 can process the digital signals of at least one wireless communication carrier.

The display module 708 can transmit and receive digital signals to and from the display 102. For example, the display module 708 receive a notification for terminating a wireless communication method from the display 102. In another example, the display module 708 can include hardware and software components to process the digital signals. For example, the display module 708 can include input handling algorithms, digital signal processing algorithms for the digital signals, network algorithms for virtually switching the digital signals to terminate the wireless communication method, among other hardware or software signal processing components.

Figure 8:
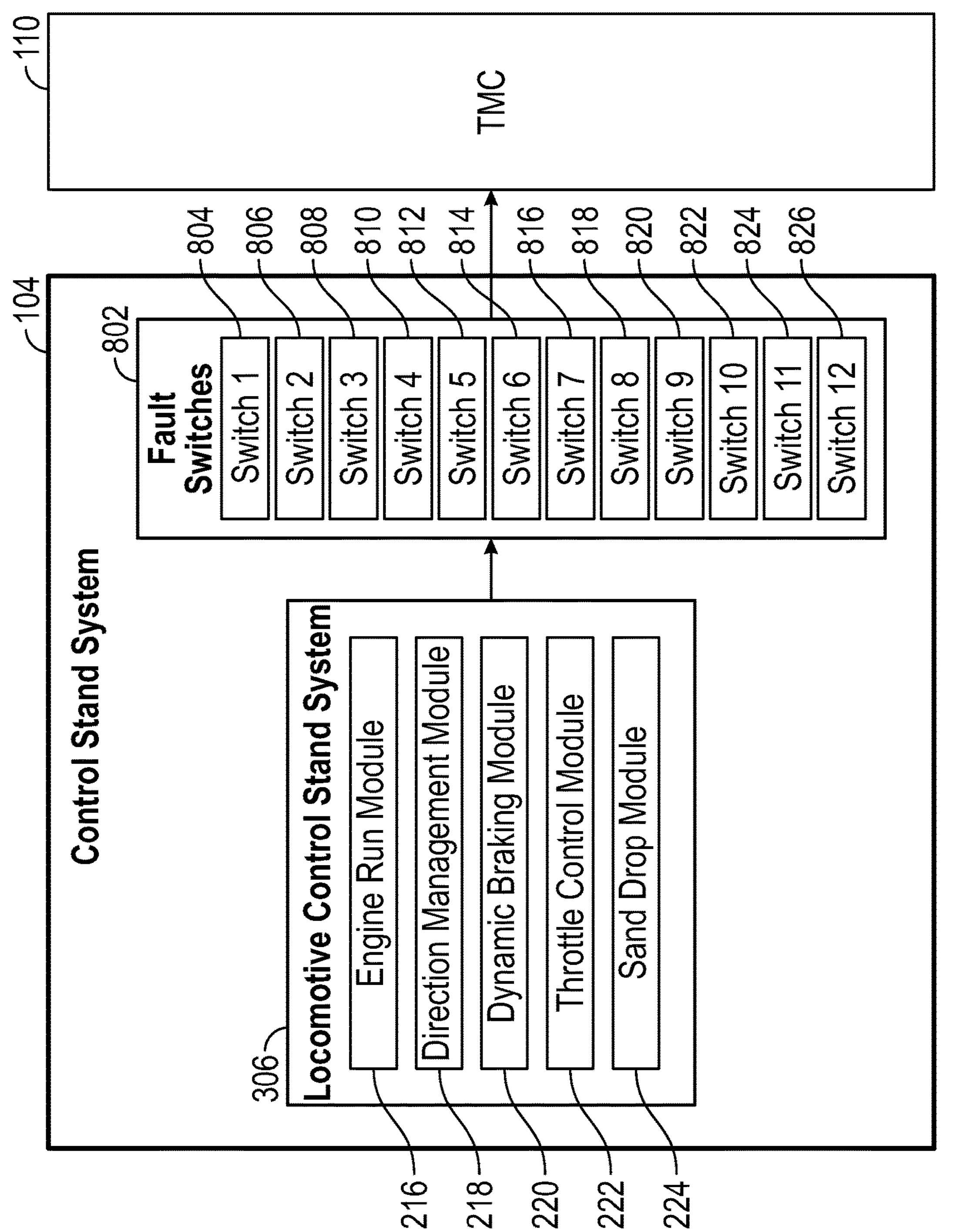
FIG. 8 illustrates a block diagram exemplifying a control stand, in accordance with one or more embodiments of the present disclosure.

FIG. 8 illustrates a block diagram of a control stand 800, in accordance with one or more embodiments of the present disclosure. The control stand 800 can include the control stand 104 coupled to the TMC 110. The control stand 104 can include the locomotive control stand system 306 and a plurality of fault switches 802. The plurality of fault switches 802 can include switches 804 through 826.

The plurality of fault switches 802 can include at least one electric switch that isolates a circuit or piece of equipment after the current has been interrupted. For example, the fault switches 802 can include the switches 804 through 826.

The switches 804 through 826 can indicate whether a troubleshooting event occurred. For example, the switches 804 through 826 can indicate a plurality of technical errors caused one of the switches 804 through 826 to change from one state to another state. In an example, the technical errors can correspond to functions of the locomotive control stand system 306. In an example, the technical errors can include faults corresponding to a locomotive function or a simulation function. For example, the locomotive function can include engine initiation, direction of travel, throttle level, dynamic braking system initiation, among other technical errors. Similarly, the simulation function can include a simulated fault of the locomotive function. In an example, the switches 804 through 826 can correspond to an "on" state when the fault is disactivated, and an "off" state when the application is activated. In an example, the switches 804 through 826 can include electrical switches, electromechanical switches, relays among other types of switches. In an example, electrical switches can include an electrical component that can disconnect or connect the conducting path in an electrical circuit, interrupting the electric current or diverting it from one conductor to another. In another example, the switches can operate by process variables such as pressure, temperature, flow, current, voltage, and force, acting as sensors in a process and used to automatically control a system. In another example, the switches can include a relay which can include a switch that is operated by another electrical circuit.

Figure 9:
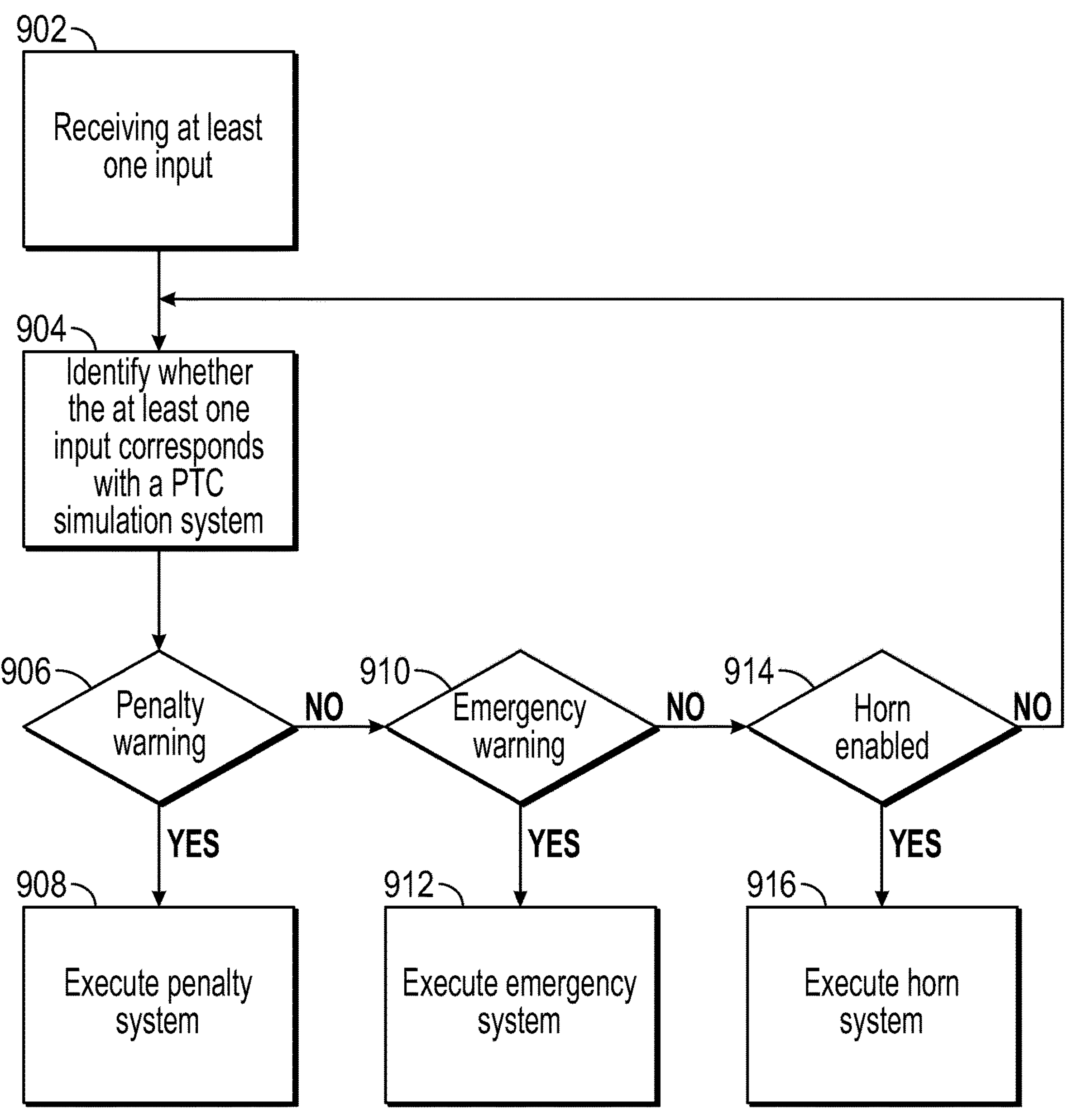
FIG. 9 illustrates a flowchart exemplifying simulation control logic, in accordance with one or more embodiments of the present disclosure.

FIG. 9 illustrates a flowchart exemplifying simulation control logic 900, in accordance with one or more embodiments of the present disclosure. The simulation control logic 900 can be implemented as an algorithm on a server 102, a machine learning module, a client, a database, or other suitable system. Additionally, the simulation control logic 900 can implement or incorporate one or more features of the PTC simulation system 300, including the display management system 302, communication system 304, locomotive control stand system 306, and simulation system 308.

The simulation control logic 900 can be achieved with software, hardware, an API, a network connection, a network transfer protocol, HTML, DHTML, JavaScript, Dojo, Ruby, Rails, other suitable applications, or a suitable combination thereof.

The simulation control logic 900 can leverage the ability of a computer platform to spawn multiple processes and threads by processing data simultaneously. The speed and efficiency of the simulation control logic 900 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The termination control logic 900 then proceeds to step 902.

At step 902, in an embodiment, the control logic 900 can receive at least one input. For example, the control logic 900 can categorize the at least one input based on a message type, instruction label, or some other method to organize digital information. In another example, the at least one input can correspond with a PTC simulation application. In an example, the at least one input can include a penalty warning, an emergency warning, and a horn enabled. In an example, the PTC simulation application can include actions from the systems and assemblies discussed in the present disclosure. For example, the penalty warning can correspond to actions and functions of the penalty assembly 118 of the pneumatic air assembly 116. In another example, the penalty warning can correspond to actions and functions of the pneumatic module 226 of the simulation system 308. Similarly, for example, the emergency warning can correspond to the emergency assembly 120 and the pneumatic module 226. Similarly, for example, the horn enabled can correspond to the horn assembly 122 and the pneumatic module 226. The control logic 900 proceeds to step 906.

At step 904, in an embodiment, the control logic 900 can identify whether the at least one input corresponds with a PTC simulation application. For example, the control logic 900 compare the at least one input with known instruction values to determine whether the at least one input matches the known values. The control logic 900 then proceeds to step 906.

At step 906, the control logic 900 can determine whether the at least one input corresponds with a penalty warning. For example, the control logic 900 can parse the at least one input and compare content of the at least one input with a known penalty value, returning an affirmative response when the at least one input matches the known penalty value. If the at least one input is not the penalty warning, the control logic 900 proceeds to step 910. If the at least one input is the penalty warning, the control logic 900 then proceeds to step 908.

At step 908, in an embodiment, the control logic 900 can execute a penalty system. For example, the penalty system can include various electrical and mechanical components to apply compressed air to a brake system. In another example, the brake system can include a physical locomotive brake system or a simulation of the physical locomotive brake system.

At step 910, in an embodiment, the control logic 900 can determine whether the at least one input corresponds with an emergency warning. For example, the control logic 900 can parse the at least one input and compare content of the at least one input with a known emergency value, returning an affirmative response when the at least one input matches the known emergency value. If the at least one input is not the emergency warning, the control logic 900 proceeds to step 914. If the at least one input is the emergency warning, the control logic 900 then proceeds to step 912.

At step 912, in an embodiment, the control logic 900 can execute an emergency system. For example, the penalty system can include various electrical and mechanical components to apply compressed air to a brake system. In another example, the brake system can include a physical locomotive brake system or a simulation of the physical locomotive brake system.

At step 914, in an embodiment, the control logic 900 can determine whether the at least one input corresponds with a horn enabled status. For example, the control logic 900 can parse the at least one input and compare content of the at least one input with a known horn enabled value, returning an affirmative response when the at least one input matches the known horn enabled value. If the at least one input is not the horn enabled status, the control logic 900 proceeds to step 904. If the at least one input is the horn enabled status, the control logic 900 then proceeds to step 916.

At step 916, in an embodiment, the control logic 900 can execute a horn system. For example, the control logic 900 can complete a horn circuit to enable a horn. In an example, the horn is a physical locomotive horn or a simulated locomotive horn.

The present disclosure achieves at least the following advantages:

1. simulates events of a PTC system without a locomotive;
2. controls electrical and mechanical components corresponding to similar components found on a locomotive to increase efficiency of training locomotive engineers and conductors;
3. enables simulation of events related to the PTC system in an accurate manner including a penalty application, an emergency application, and a horn application; and
4. optimizes training of locomotive engineers and conductors in a simulated environment to ensure focus on practical safety applications.

Persons skilled in the art will readily understand that these advantages (as well as the advantages indicated in the disclosure) and objectives of this system would not be possible without the particular combination of computer hardware and other structural components and mechanisms assembled in this inventive system and described herein. The algorithms, methods, and processes disclosed herein improve and transform any general-purpose computer or processor disclosed in this specification into a special purpose computer programmed to perform the disclosed algorithms, methods, and processes. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A method of simulating positive train control (PTC) applications, comprising:

receiving at least one input;

identifying whether the at least one input corresponds with a PTC simulation application of a pneumatic air assembly; and executing a corresponding system of a plurality of systems of the pneumatic air assembly in response to identifying whether the at least one input corresponds with the PTC simulation application, wherein the plurality of systems of the pneumatic air assembly comprises a penalty system, an emergency system, and a horn system, and wherein the pneumatic air assembly is configured to receive an electrical input and convert the electrical input into mechanical energy to control air pressure.

2. The method of claim 1, wherein the at least one input includes a penalty warning, an emergency warning, and a horn.

3. The method of claim 2, wherein when a first input of the at least one input corresponds to the penalty warning, the method further comprises:

controlling at least one relay of the pneumatic air assembly to energize a penalty magnetic valve of the pneumatic air assembly; and supplying compressed air at a first pressure from the penalty magnetic valve to at least one air pneumatic component.

4. The method of claim 3, wherein when a first input of the at least one input corresponds to the penalty warning, the method further comprises:

reducing the first pressure to a second pressure;

energizing a vent magnetic valve of the pneumatic air assembly in response to reducing the first pressure; and reducing the second pressure completely from the at least one air pneumatic component.

5. The method of claim 3, wherein the at least one air pneumatic component includes a brake pipe, a brake cylinder, and an equalizer reservoir.

6. The method of claim 2, wherein when a first input of the at least one input corresponds to the horn, the method further comprises completing a horn circuit of the pneumatic air assembly to enable the horn based on a horn instruction.

7. The method of claim 6, wherein the horn instruction includes a user input to enable the horn.

8. The method of claim 6, wherein the horn instruction includes an input from a train management computer.

9. The method of claim 1, wherein the penalty system is configured to receive the electrical input and convert the electrical input to mechanical energy to control air pressure based on a penalty instruction from a train management computer.

10. The method of claim 1, wherein the emergency system is configured to receive the electrical input and convert the electrical input to mechanical energy to control air pressure based on an emergency instruction from a train management computer.

11. The method of claim 1, wherein the horn system is configured to receive the electrical input and convert the electrical input to mechanical energy to control air pressure based on a horn instruction from a train management computer.

* * * * *